Nov. 17, 1964  J. P. MONCURE  3,156,946
APPARATUS FOR PROCESSING CRABS
Filed April 26, 1961  15 Sheets-Sheet 1

INVENTOR:
JEWETT P. MONCURE
BY
ATTORNEY

Nov. 17, 1964  J. P. MONCURE  3,156,946
APPARATUS FOR PROCESSING CRABS
Filed April 26, 1961  15 Sheets-Sheet 3

INVENTOR:
JEWETT P. MONCURE
BY
*Robert A. Lavender*
ATTORNEY

Nov. 17, 1964
J. P. MONCURE
3,156,946
APPARATUS FOR PROCESSING CRABS
Filed April 26, 1961
15 Sheets-Sheet 4
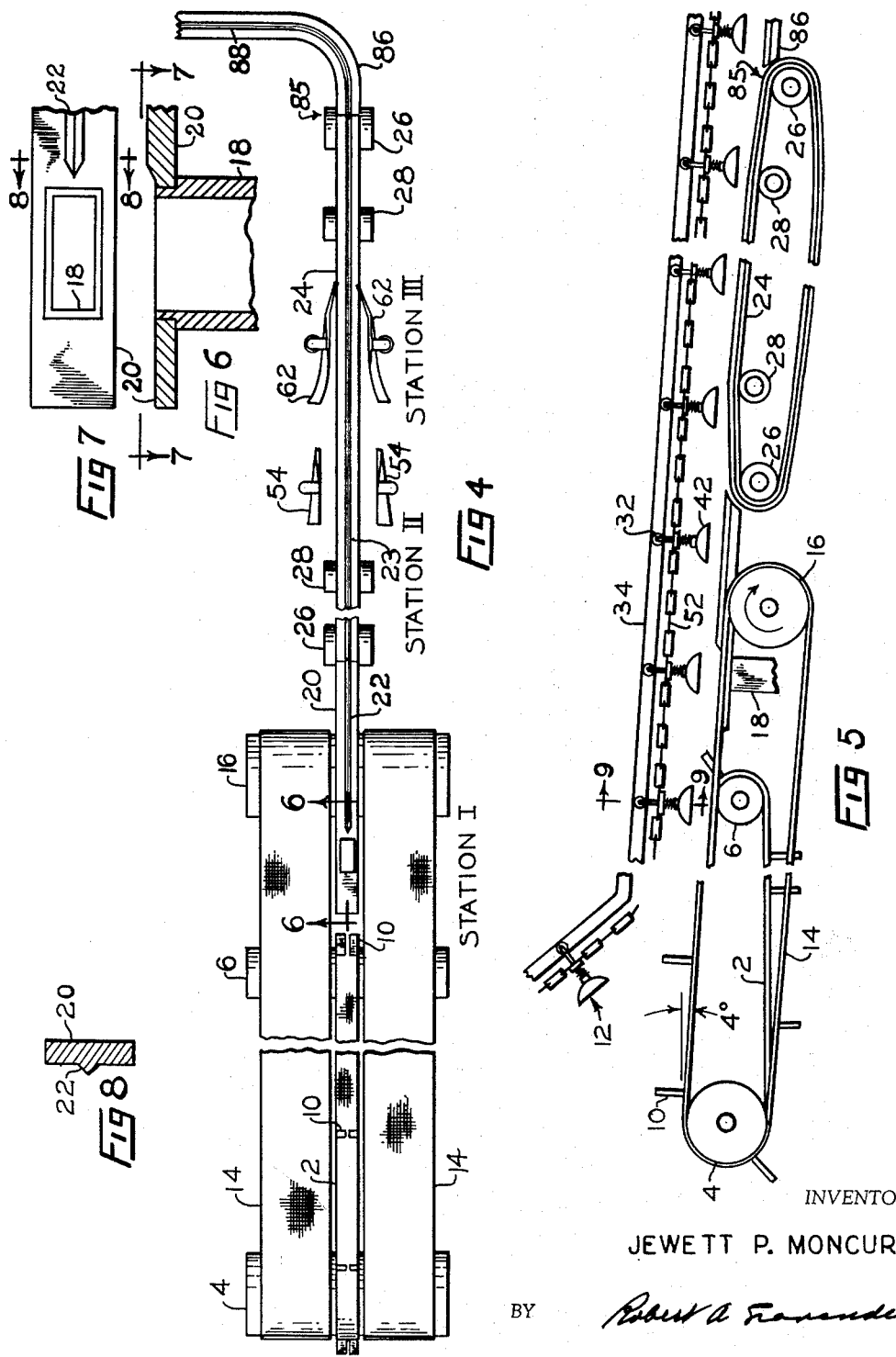
INVENTOR:
JEWETT P. MONCURE
BY
ATTORNEY Nov. 17, 1964   J. P. MONCURE   3,156,946
APPARATUS FOR PROCESSING CRABS
Filed April 26, 1961   15 Sheets-Sheet 5
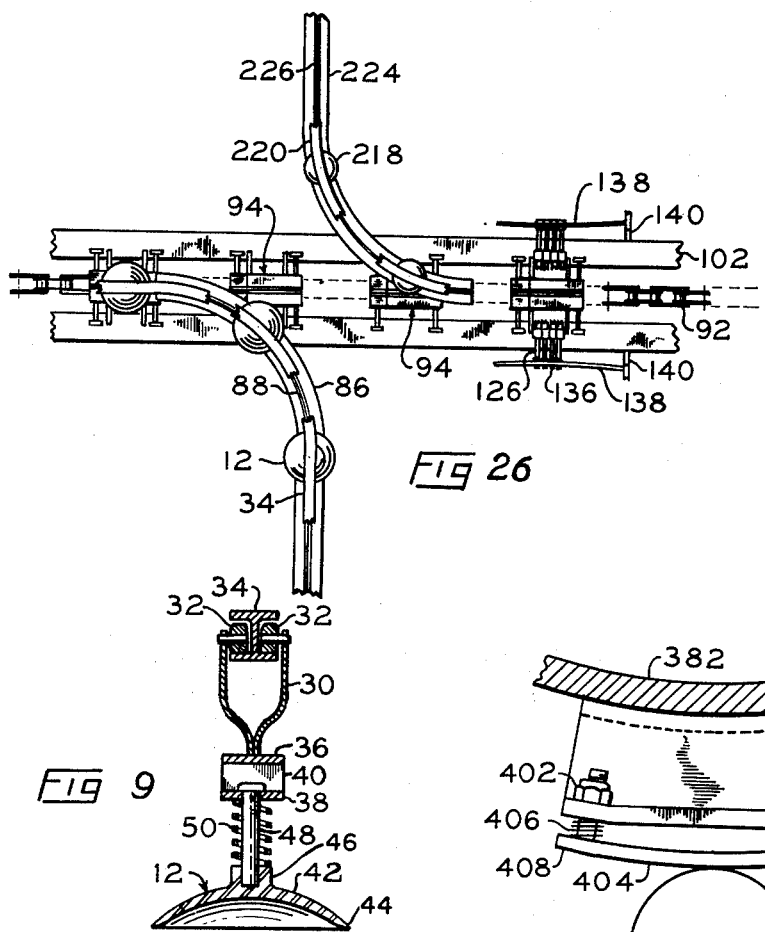
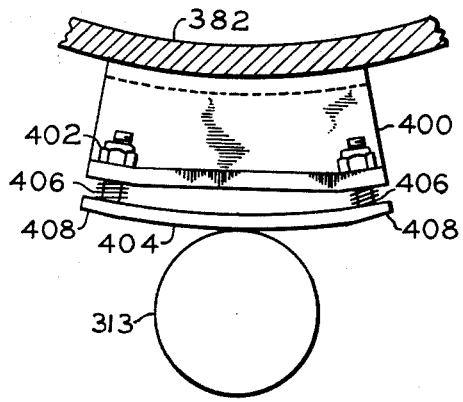
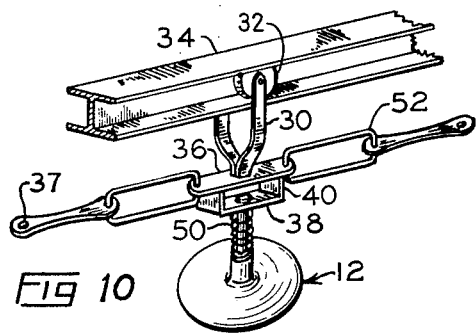
INVENTOR:
JEWETT P. MONCURE
BY
Robert A. Favender
ATTORNEY

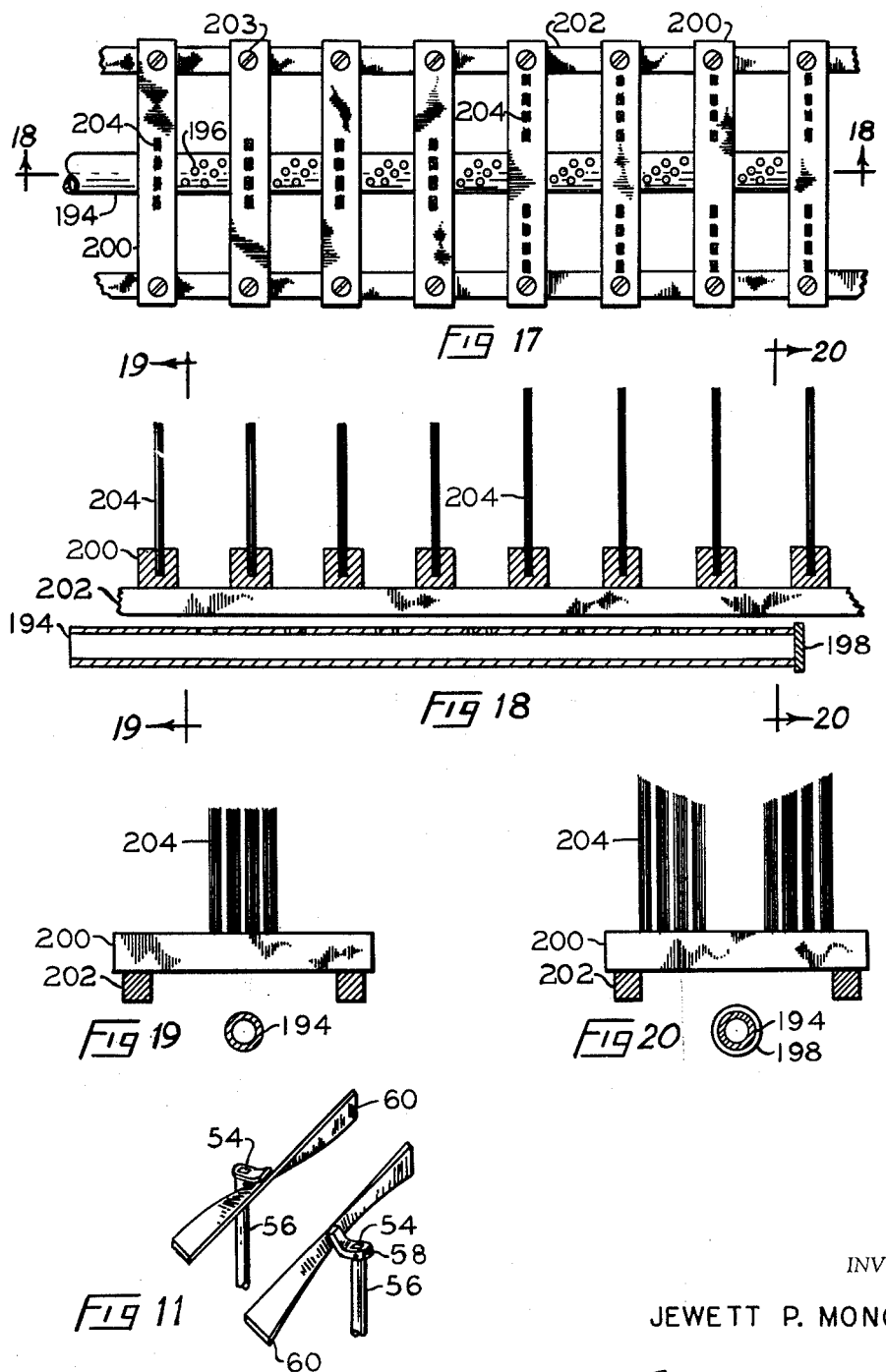

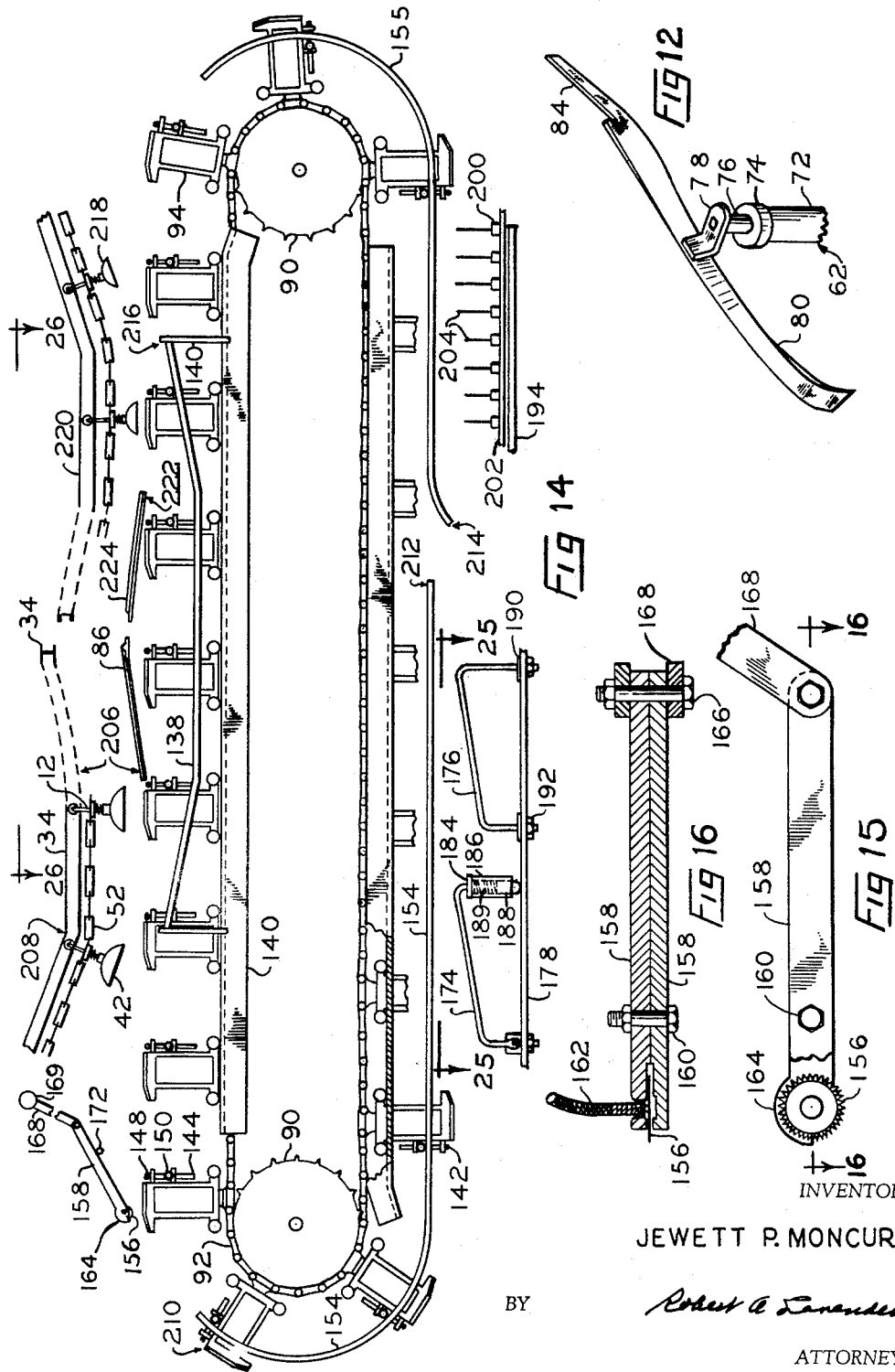

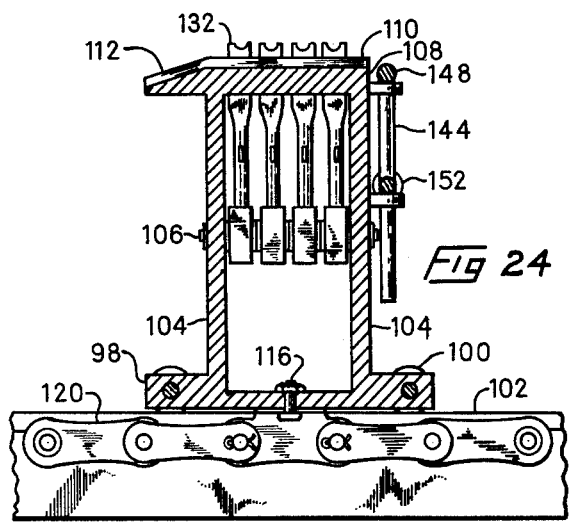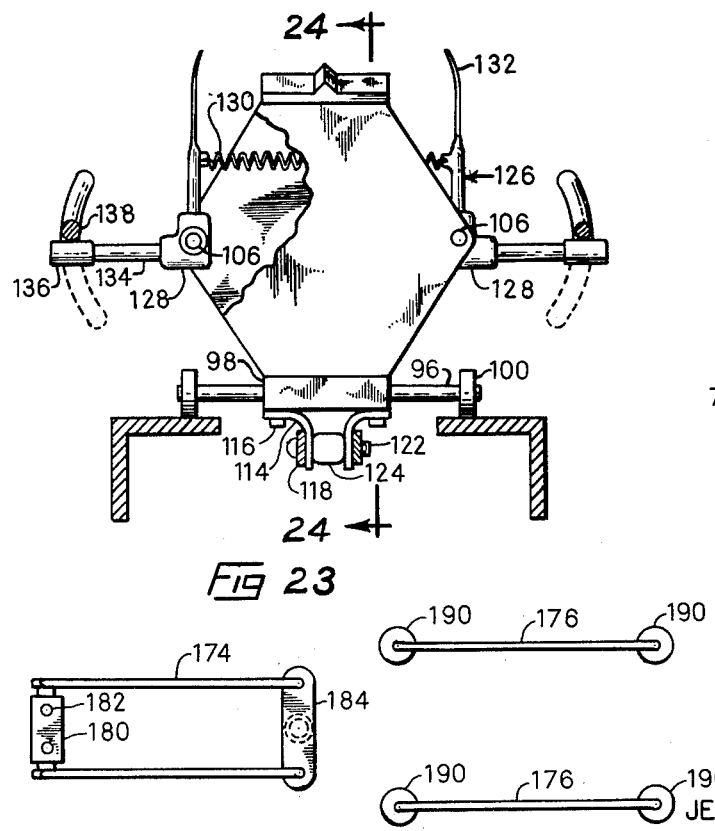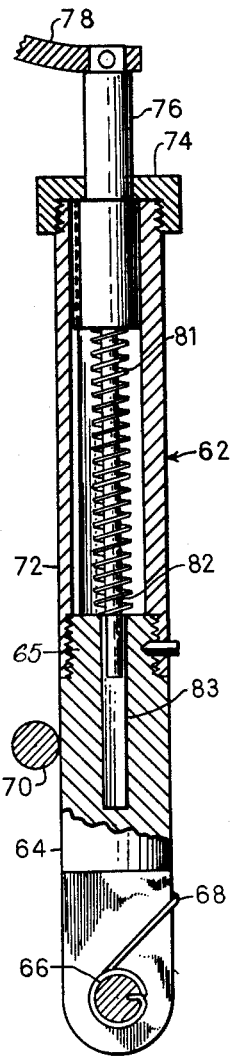
Nov. 17, 1964  J. P. MONCURE  3,156,946
APPARATUS FOR PROCESSING CRABS
Filed April 26, 1961  15 Sheets—Sheet 8
INVENTOR:
JEWETT P. MONCURE
BY
ATTORNEY

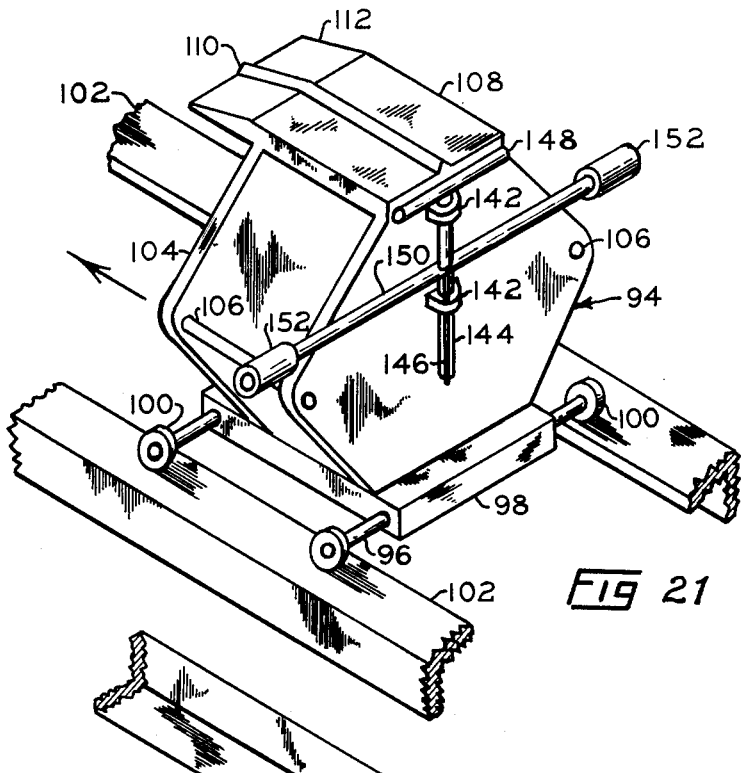
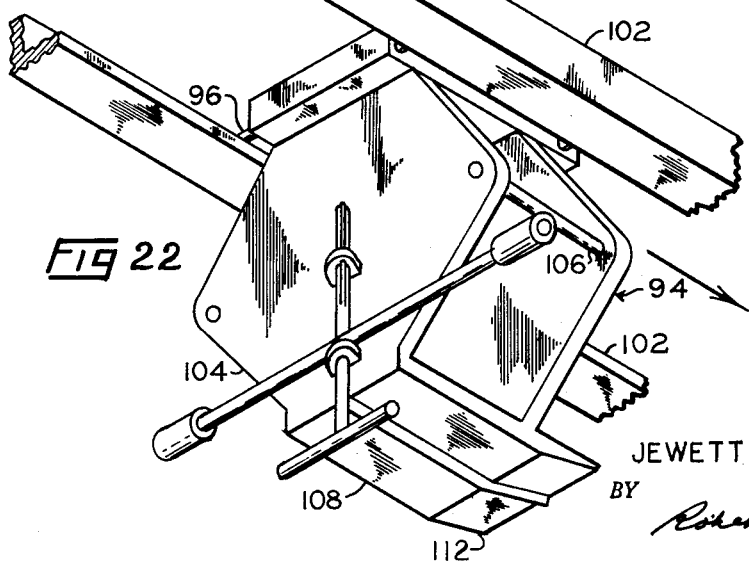

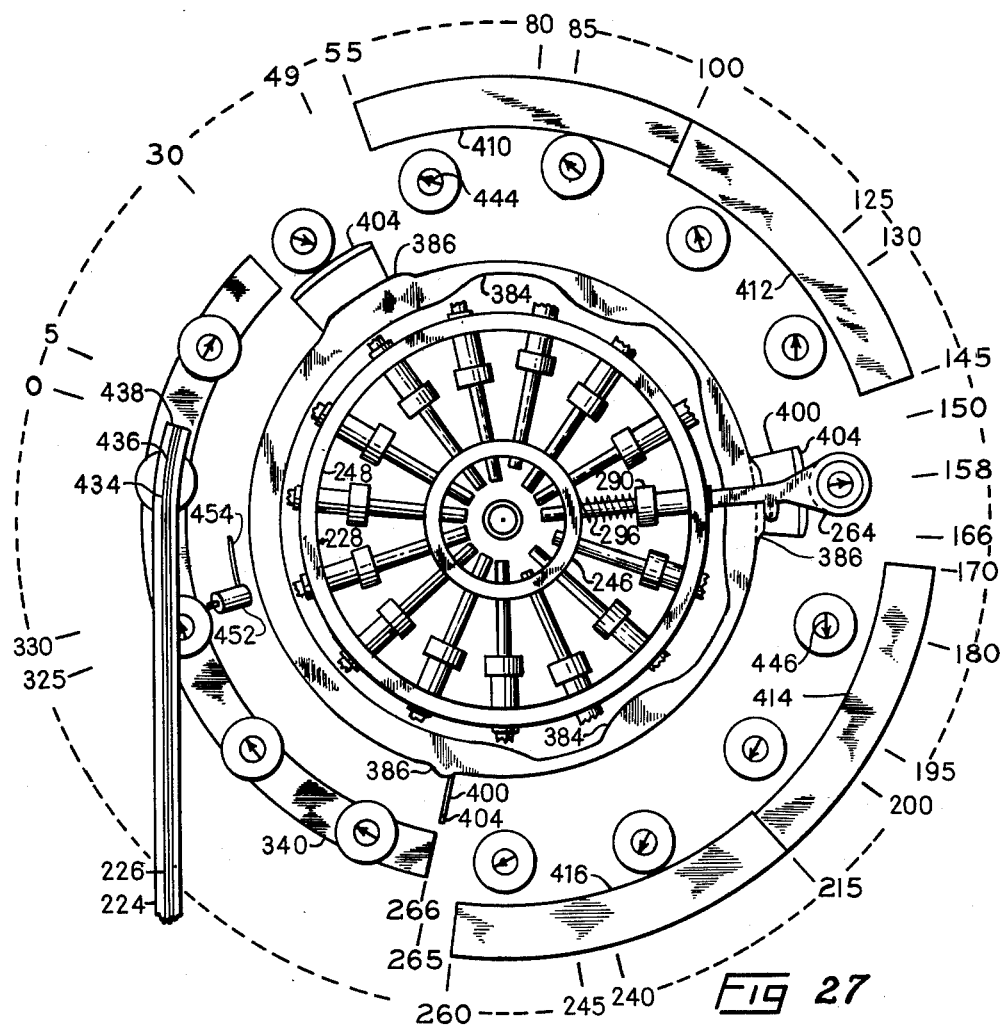

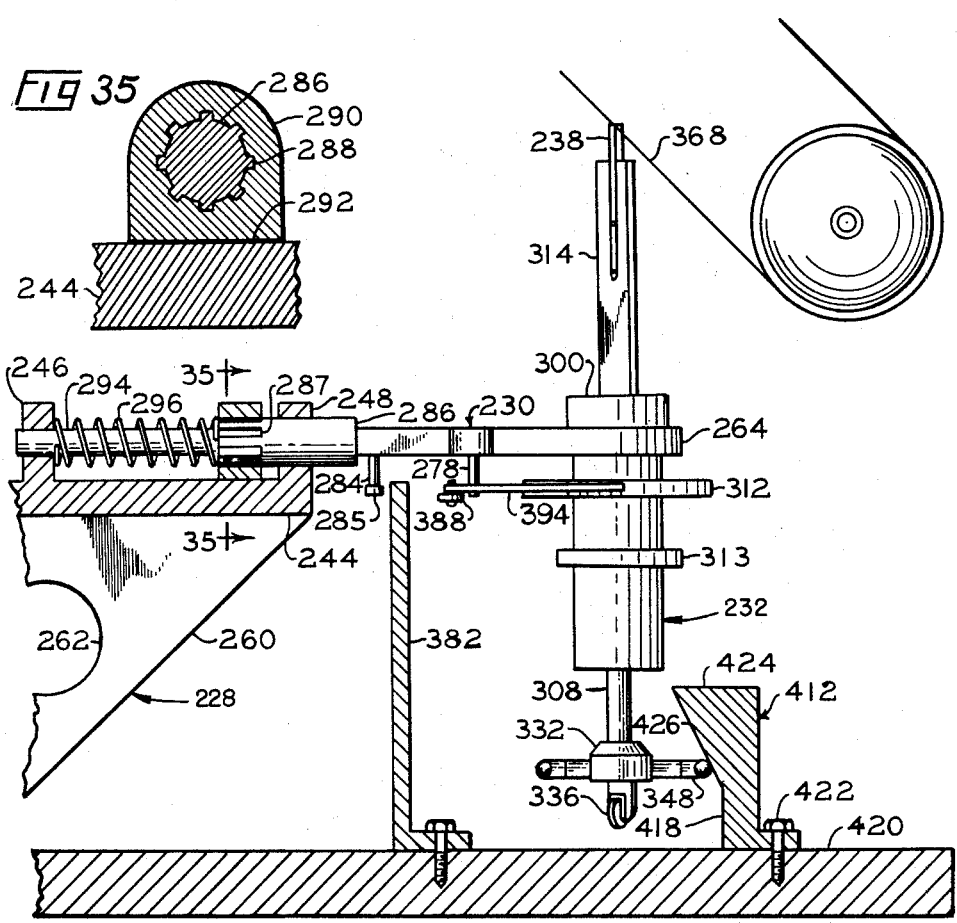
Fig 35
Fig 34
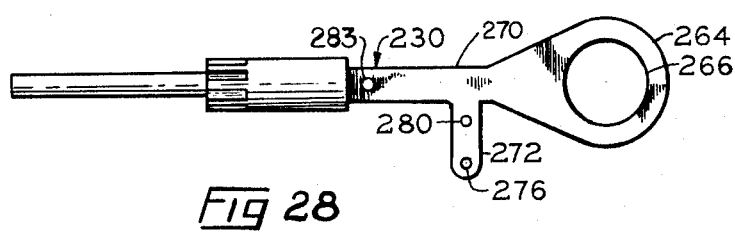
Fig 28
INVENTOR:
JEWETT P. MONCURE
BY
ATTORNEY Nov. 17, 1964   J. P. MONCURE   3,156,946
APPARATUS FOR PROCESSING CRABS
Filed April 26, 1961   15 Sheets-Sheet 12

INVENTOR:
JEWETT P. MONCURE
BY
ATTORNEY

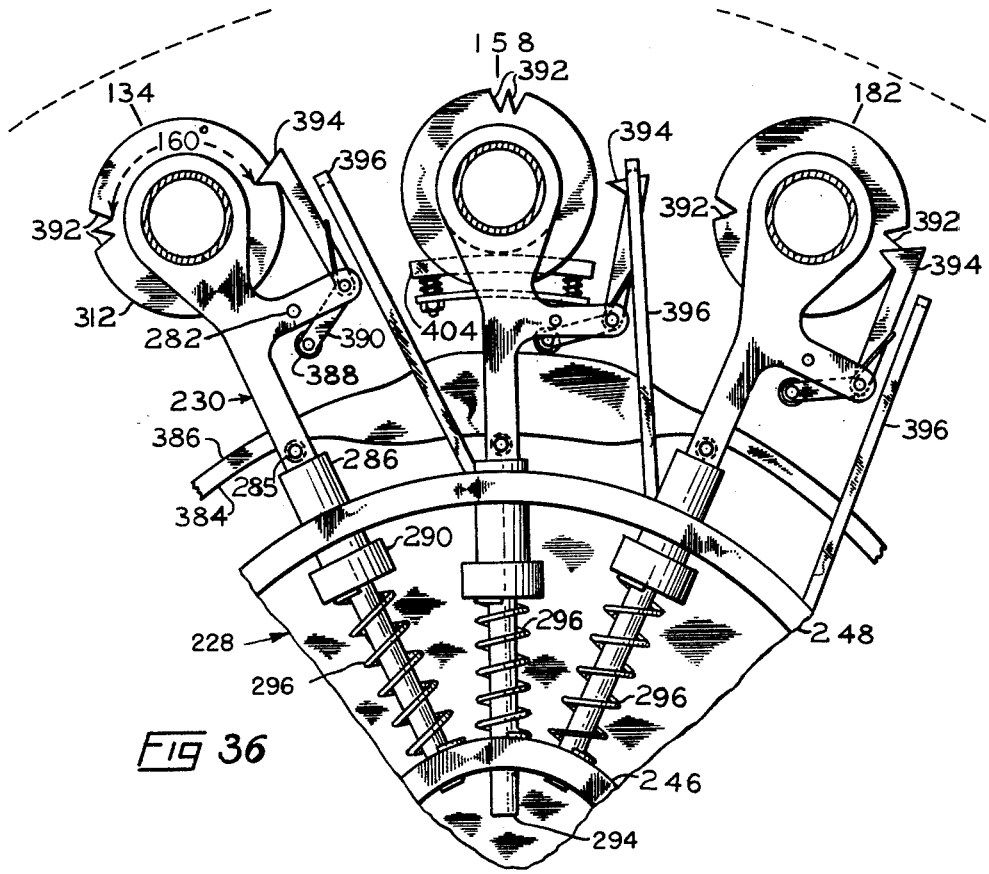
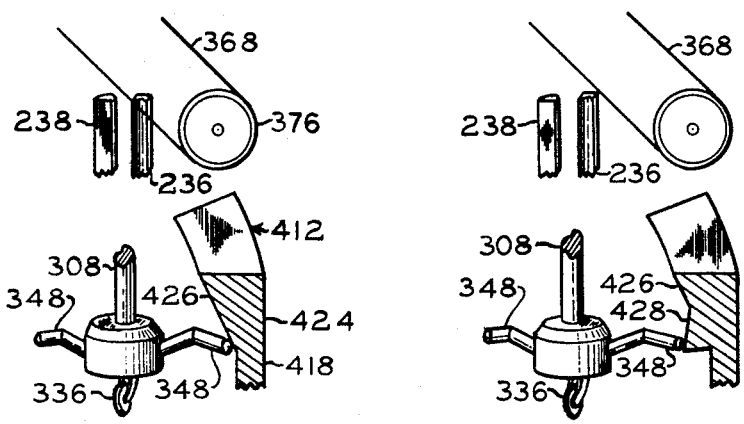

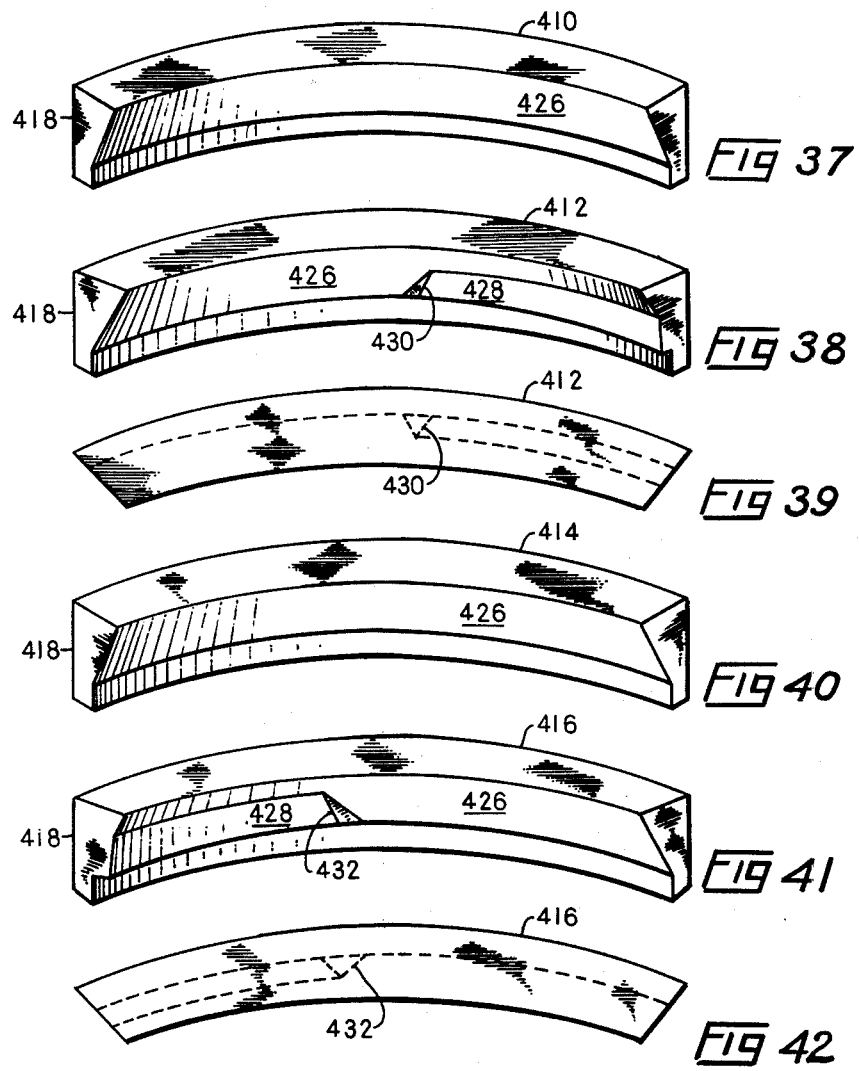

United States Patent Office 3,156,946
Patented Nov. 17, 1964

3,156,946
APPARATUS FOR PROCESSING CRABS
Jewett P. Moncure, 203 Nottingham Road,
Richmond, Va.
Filed Apr. 26, 1961, Ser. No. 117,250
32 Claims. (Cl. 17—2)

This invention relates generally to apparatus for the processing of crabs, that is, the preparing of crabs for the actual removal of their meat.

The invention relates more particularly to the sequence of operations of steps thereof and machines for and the combination of parts thereof to process crabs, which is defined as to dismember and clean crabs of their inedible parts and to so trim and section the crab thorax that the meat therein may be easily removed.

This invention will be disclosed and described as being applied to the processing of the comparatively smaller swimming crabs, such as the Blue Crab, but it will be apparent that the apparatus disclosed and claimed herein are applicable to the processing of many other species of crabs and to the processing of many substances both organic and inorganic.

The Blue Crab meat industry is almost unique among industries in the fact that it is still almost entirely dependent upon manual operations for the extraction of its product. The exception is that relatively small part of the industry that is engaged in the canning of crab meat, which meat is recovered in a finely-divided state through a process such as is set forth in an "Apparatus for the Recovery of Crab Meat From Bony Material by Gravity Liquid Separation," covered by U.S. Patent 2,545,517, issued to Sterling G. Harris et al., dated March 20, 1951.

There are two reasons why this industry, with the exception just noted, has not found their use to be profitable and has not accepted any of the various prior inventions relating to the extraction of crab meat but instead, continues the "picking" of crabs by manual workers employing no other aid than the crab-picking knife: (1) the saving of labor or time over the manual method is insufficient to justify the use of a particular invention and/or (2) the use of the invention breaks up the "back fin" crab meat (which meat, comprising the muscles actuating the fins, is esteemed, because of its large segments, as of the finest quality and is marketed at the highest price) and thereby sacrifices more in the greatly diminished profit obtainable from this particular crab meat than could be gained by even the complete elimination of all picking charges.

In the practice of the present invention, a crab after it has been steamed, is placed on one end of a conveyor in the form of a moving belt and is not touched by hands until after it is pushed aside from the apparatus with its thorax meat almost completely exposed and easily removable.

In practicing this invention, the crab is caused to pass through eleven operating stations in the apparatus at which stations eleven corresponding steps of the method are accomplished as follows: (I) drawing away of the abdomen from the thorax and thus exposing the ventral thoracic groove; (II) stripping away or breaking off the claws at the knuckles, which are defined herein as the parts of the crab where the various specialized leg members (claws, legs and fins) join the thorax; (III) break-off the legs and fins at the knuckles; (IV) cutting through and removing the carapace; (V) removing the abdomen; (VI) removing the masticating organs, internal organs and gills; (VII) cleaning the thorax by a water spray; (VIII) trimming from the thorax the leg knuckles of the right side thereof by cutting through the inner ends of said knuckles in a vertical plane; (IX) cutting through the right side of the thorax in a plane inclined from the vertical at such an angle as to sever the dorsally-located extensor muscles from the ventrally-located flexor and fin muscles of that side; (X) trimming from the thorax the leg knuckles of the left side thereof by cutting through the inner ends of said knuckles in a vertical plane; and (XI) cutting through the left side of the thorax in a plane inclined from the vertical at such an angle as to sever the dorsally-located extensor muscles from the ventrally-located flexor and fin muscles of that side.

The principal object of the invention is to provide an apparatus to process a crab, that is, to dismember and remove the internal organs of the crab and to trim and section the crab's thorax to expose the meat in the chambers of the thorax, that the meat therein may be easily and completely removed.

Another object of the invention is to provide an apparatus consisting of a plurality or series of conveyors for a crab and mechanisms juxtaposed the path of the conveyors and their carriers for progressively dismembering and cleaning the crab and trimming and sectioning the crab thorax.

Another object of the invention is to provide a crab processing machine in which the median ventral thoracic groove of the crab increases lateral stability of the crab as it passes through the various operating stations in the machine.

Another object of the invention is to provide a crab processing apparatus by which the meat in the thorax of the crab is exposed by sectioning the thorax in planes at angles to its longitudinal and vertical axes.

Another object of the invention is to provide a crab processing machine by the use of which time and labor costs are reduced below the cost of operation of other systems.

Another object of the invention is to provide a crab processing machine that permits the recovery of the fin muscles in an unbroken condition and thus preserves that characteristic of the fin meat which enhances its quality and price.

Another object of the invention is to provide a crab processing machine by the operation of which chitin and other "trash" found in the picked meat is reduced to a minimum.

Another object of the invention is to provide a crab processing machine that can process uncooked crabs soon after steaming and thereby save the time otherwise required for their cooling.

Other objects and advantages of the invention will be apparent from the following detailed description of the invention set forth herein and from the accompanying drawings made a part thereof in which:

FIGURE 4 is a plan view of the belt conveyors of the combined belt and trolley conveyor system shown in FIGURE 1, and their associated mechanisms;

FIGURE 5 is a side elevation view of the combined belt and trolley conveyor system shown in FIGURE 1, and their associated mechanisms;

FIGURE 6 is an enlarged cross section view taken on line 6—6, FIGURE 4;

FIGURE 7 is a plan view taken on line 7—7, FIGURE 6;

FIGURE 8 is a cross section view taken on line 8—8, FIGURE 7;

FIGURE 9 is an enlraged cross section view taken on line 9—9, FIGURE 5;

FIGURE 10 is a view in perspective of one section of the trolley conveyor shown in FIGURE 5;

FIGURE 11 is a view in perspective of a pair of arms and supports positioned to break away the claws of the crab at Station II;

FIGURE 12 is a view in perspective of an arm and support positioned to break away the legs and fins of the crab at Station III;

FIGURE 13 is an enlarged cross section view, with parts shown in elevation, of the support for the arm shown in FIGURE 12;

FIGURE 14 is a side elevation view of the section of the machine shown in FIGURE 2 and showing the relative positions of the associated mechanisms;

FIGURE 15 is a side elevation view of a disc saw and its mounting arm;

FIGURE 16 is a cross section view taken on line 16—16, FIGURE 15;

FIGURE 17 is a plan view of structure adapted to remove the organs and gills and clean the thorax of a crab;

FIGURE 18 is a cross section view taken on line 18—18, FIGURE 17;

FIGURE 19 is a cross section view taken on line 19—19, FIGURE 18;

FIGURE 20 is a cross section view taken on line 20—20, FIGURE 18;

FIGURE 21 is a view in perspective of a crab carrier on its upper run on endless chain conveyor shown in FIGURE 14;

FIGURE 22 is a view in perspective of a crab carrier on its lower run on endless chain conveyor shown in FIGURE 14;

FIGURE 23 is an end view partly in cross section of a carrier as shown in FIGURE 22 and showing cam surfaces associated therewith;

FIGURE 24 is a cross section view taken on line 24—24, FIGURE 23;

FIGURE 25 is a plan view of cam surfaces associated with the endless chain conveyor shown in FIGURE 14;

FIGURE 26 is a plan view of the trolley conveyors leading to and extending from the endless chain conveyor shown in FIGURE 14;

FIGURE 27 is a plan view of the conveyor system adapted to move a crab through Stations VIII, IX, X and XI, as defined hereinbefore;

FIGURE 28 is a plan view of a conveyor arm, shown in FIGURE 27;

FIGURE 31 is an enlarged horizontal cross section view taken on line 31—31, FIGURE 29;

FIGURE 33 is a plan view of a mechanism for rotating a carrier on its vertical axis;

FIGURE 34 is a partial vertical cross section view of the turret and the cam cylinder, with side elevation views of a conveyor arm and a carrier, shown as the carrier passes a band saw;

FIGURE 35 is an enlarged cross section view taken on line 35—35, FIGURE 34;

FIGURE 36 is a plan view of three conveyor arms, with one carrier locked in one position, one carrier being rotated about its vertical axis and one carrier locked in a second position;

FIGURE 37 is a view in perspective of a cam which, when the right vertical trimming cut is being effected, cooperates with a follower near the lower end of a carrier so as to control the radial position of this carrier relative to the median length of the individual thorax being carried;

Figures 45, 46:
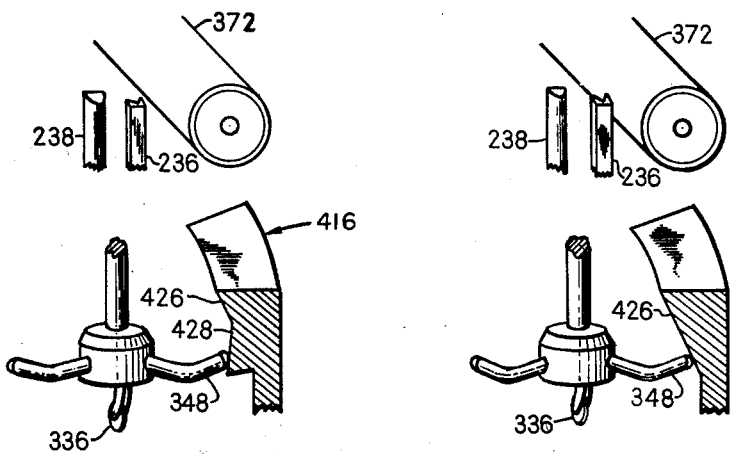

FIGURE 38 is a view in perspective of a cam which, when the right inclined sectioning cut is being effected, cooperates with a follower near the lower end of a carrier so as to control the radial position of this carrier relative to the median length of the individual thorax being carried, the cam being additionally shaped to prevent interference between the inclined saw and the anterior gripper after the completion of the cut;

FIGURE 39 is a plan view of the cams shown in FIGURE 38;

FIGURE 40 is a view in perspective of a cam similar to that shown in FIGURE 37, but positioned to control the radial position of a carrier when the left vertical trimming cut is being effected;

FIGURE 41 is a view in perspective of a cam similar to that shown in FIGURE 38, but positioned to control the radial distance of a carrier when the left inclined sectioning cut is being effected and shaped to prevent interference between the inclined saw and the anterior gripper before the start of the cut;

FIGURE 42 is a plan view of the cam shown in FIGURE 41;

FIGURE 43 is a perspective view of the lower section of a carrier, shown approaching the viewer, with its follower engaging a cam surface of greater radius during the right inclined cut and a view of the upper section of the carrier as, at the same time, its anterior gripper approaches the saw;

FIGURE 44 is a perspective view of the lower section of a carrier, shown approaching the viewer, with its follower engaging a cam surface of lesser radius after the right inclined cut has been completed and a view of the upper section of the carrier as, at the same time, its anterior gripper passes clear of the saw;

FIGURE 45 is a perspective view of the lower section of a carrier, shown approaching the viewer, with its follower engaging a cam surface of lesser radius before the left inclined cut has been started and a view of the upper section of the carrier as, at the same time, its anterior gripper passes clear of the saw; and FIGURE 46 is a perspective view of the lower section of a carrier, shown approaching the viewer, with its follower engaging a cam surface of greater radius during the left inclined cut and a view of the upper section of the carrier as, at the same time, its anterior gripper recedes from the saw.

Figure 1:
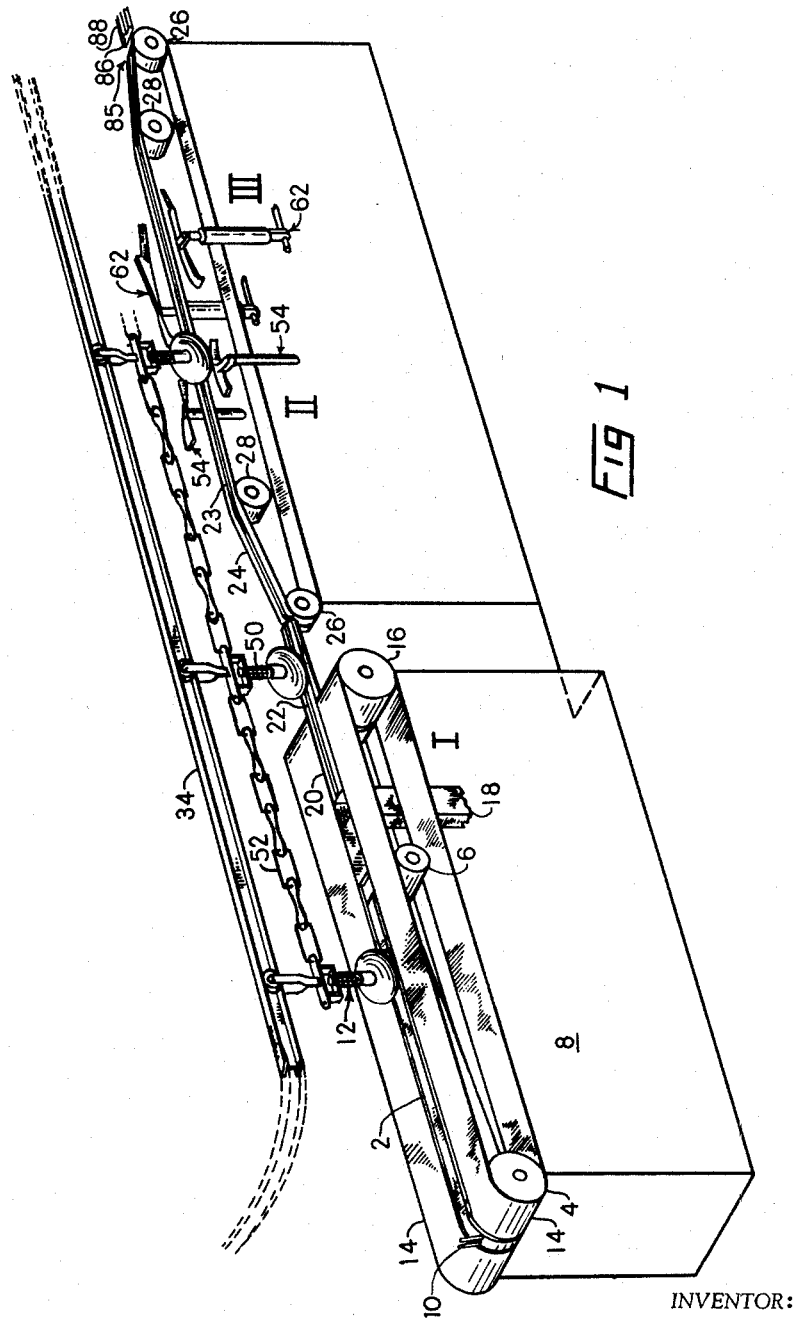
FIGURE 1 is a view in perspective of one section of one embodiment of the invention and illustrating the equipment adapted for use at Stations I, II and III, as defined hereinbefore.
Figure 2:
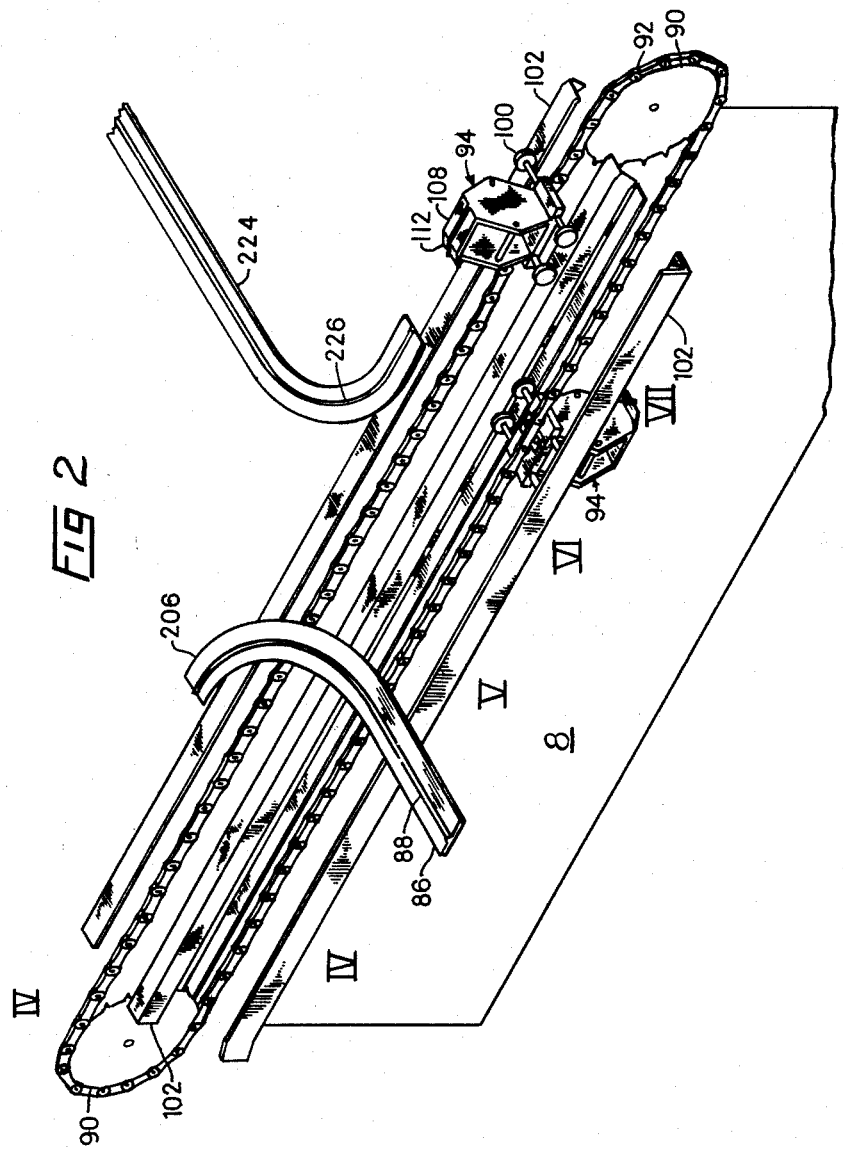
FIGURE 2 is a view in perspective of one section of one embodiment of the invention and illustrating the equipment adapted to move a crab through Stations IV, V, VI and VII, as defined hereinbefore.
Figure 3:
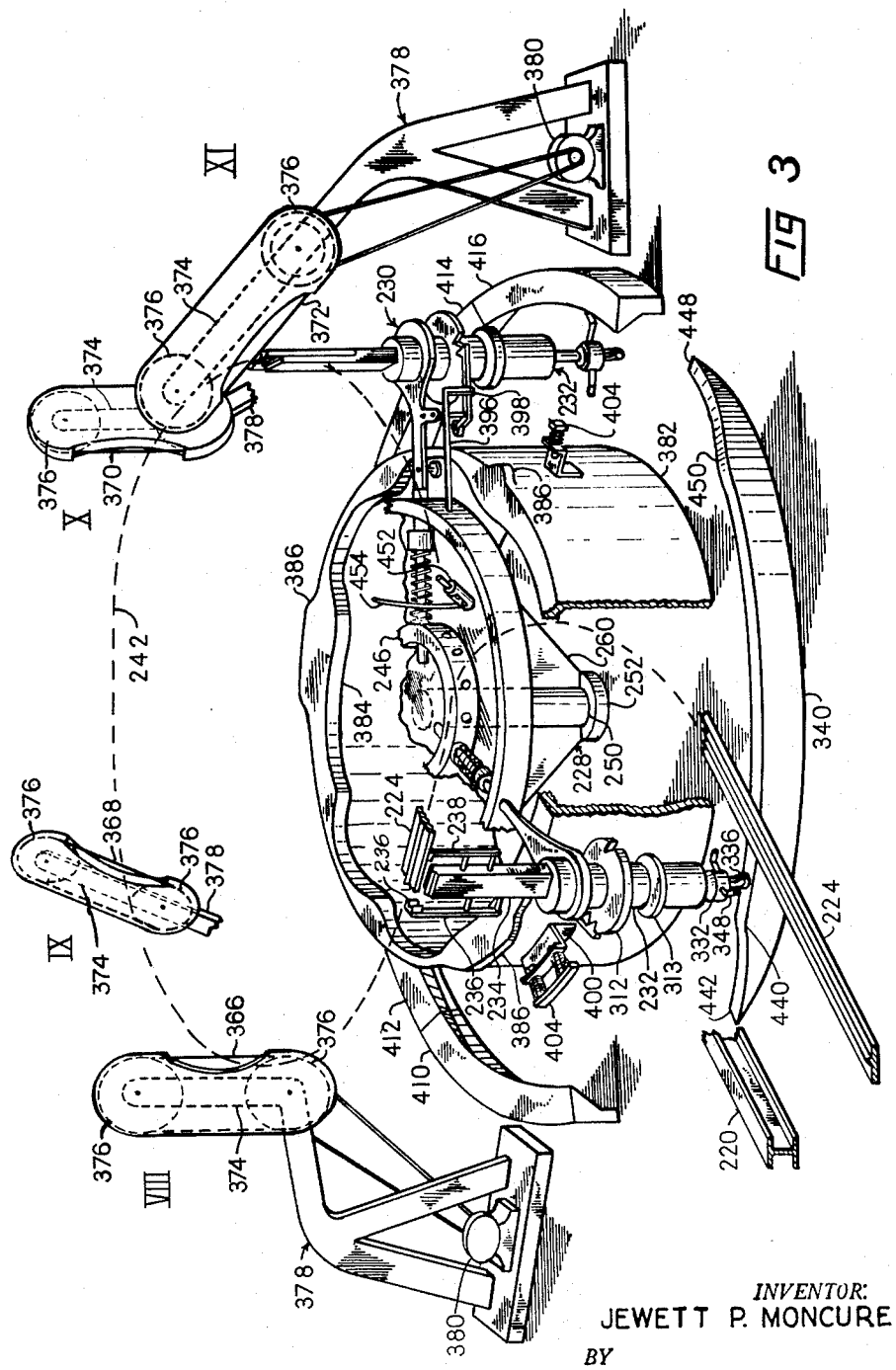
FIGURE 3 is a view in perspective of one section of one embodiment of the invention and illustrating the equipment adapted to move a crab through Stations VIII, IX, X and XI, as defined hereinbefore.

There is shown in the combination of FIGURES 1, 2 and 3 the four conveyor systems by which the crab is moved along a definite path through the apparatus and along which path the crab passes by Stations I to XI, inclusive, at which stations the definite steps in the practicing of this invention take place, as defined hereinbefore. These stations are indicated on the several figures by Roman numerals.

Referring particularly to FIGURES 1, 4, 5, 6, 7, 8, 9 and 10, the member 2, made of some flexible material, and supported by drums 4 and 6, which in turn are supported on a base 8, represents a conveyor in the form of an endless belt which is part of the combined endless belt and trolley conveyor system comprising the first conveyor system of the machine.

On belt 2 are positioned paired projections 10 separated from each other and adapted to engage therebetween the anterior center of the carapace of the crab. The pairs of projections 10 are separated along belt 2 by a "standard" distance, that is, a predetermined distance along the said first conveyor system as well as three other conveyor systems of the machine all to be fully described hereinafter. As belt 2 and all other conveyor units of the machine are driven at the same linear velocity, there can be no congestion of crabs as they are transferred from one conveyor system to another. Projections 10 also serve as points of reference on belt 2 whereby the crabs are correctly positioned relative to overhead trolley carriers, shown generally as at 12 and shown in detail in FIGURES 9 and 10.

Outboard on each side from belt 2 are belts 14, which are carried by drums 4 and 16, driven by a common source of power, such as an electric motor (not shown). The belts 2 and 14 travel on their upper runs in approximately a horizontal direction, but preferably at a slight decline, for example, four or more degrees, that the crabs may tend to slide forward, under the effect of gravity and vibrations, toward and keep up against the next ahead pair of projections 10 and thus be directly below and under the pressure of the cups of the trolley carrier 12, before projections 10 have completed their upper run.

Between the delivery end of belt 2 and the delivery ends of belts 14, and supported on the base of the machine by a chute 18, is plate 20 in which is cut a rectangular suction port corresponding in side and shape to the top of chute 18. The upper surface of plate 20 to the left of chute 18 is flat, while the upper surface of plate 20 to the right of the chute has a triangular ridge 22 (FIGURE 8) corresponding in general cross sectional dimensions with the groove in the ventral surface of the thorax of the crab. The chute 18 is connected to a source of vacuum (not shown), such as a conventional vacuum pump. As the crab passes over the chute 18, its abdomen is pulled away from the thorax of the crab by the force of the vacuum, thus exposing the median groove in the ventral surface of the thorax. As the crab has been centered on belt 2 by placing the anterior central point of its carapace between projections 10, the ridge 22 engages the said groove and the crab is stabilized against lateral movement as it is pulled along plate 20 by the trolley carriers 12.

As the abdomen of the crab is pivotly fastened at its posterior end to the posterior end of the thorax, the abdomen is pulled down under the force of the vacuum into chute 18 and some of the abdomen may be scraped off by the downstream transverse edge of the chute. The parts of the abdomen scraped off will fall down the chute and the parts not scraped off will drag along behind the thorax as the crab is moved forward over plate 20 by trolley carriers 12. Thus Step I is completed.

To the right of plate 20 is endless belt 24 which is supported at its ends by idler and driving drums 26 and supported on its upper run by idler drums 28, which drums may be supported on the base 8 of the machine by conventional springs. The drums 28 are higher above the base of the machine than drums 26 so that the upper run of the belt is closer to the track 34 that supports carriers 12. The relatively closer positions of the crabs on belt 24 to the track will cause a relatively greater force to be exerted by carriers 12 on the backs of the crabs, as they pass through Stations II and III. The upper surface of belt 24 has a ridge 23 similar to ridge 22 of plate 20 to engage the thoracic groove of the crab and thus provide lateral stability of the crab as it is moved forward under the forces of the belt and the carrier 12.

Referring particularly to FIGURES 9 and 10, the trolley carrier 12 consists of a bifurcated member 30, carrying at its upper ends the rollers 32 adapted to engage the lower flange of track 34. The lower end of the member 30 is secured by welding or otherwise to a frame consisting of an upper plate 36 and a lower plate 38, with members 40 therebetween. The carrier 12 includes a conventional vacuum cup 42, which may be made of some soft flexible material, tapered at its lower edge, as at 44, and thickened at its upper end, as at 46, where it is rigidly secured to pin 48 extending through and slideably dependent from plate 38. A spring 50 is positioned between upper end 46 of the cup 42 and plate 38 to resiliently force cup 42 against a crab carried thereby as may be desired, such as when the crab is passing Stations II and III. Carriers 12, driven at the standard velocity by a source of power such as a motor, are spaced apart and moved along track 34 by conventional links 52, the sum of the lengths of the links being such that an integral number of links and the length of plate 36 between end links equals in length the standard distance in the several conveyor systems in the apparatus. Track 34 is supported at such a height above the belts, plate and slideway that a sufficient pressure will be exerted on the crab to accomplish the purposes of the various stations.

Referring particularly to FIGURES 1, 4 and 11, there are mounted at both sides of belt 24 the helically-shaped arms, shown generally at 54 and shown in detail in FIGURE 11. These arms 54 consist of a vertical rod 56 and a side extending piece 58 to which a helically-shaped blade 60 is attached. The rod is secured to the base of the machine in any conventional manner.

As the crab passes between arms 54, blades 60 progressively rotate downward the first section of the claw, which is nearest the thorax, until it is broken off at its knuckle, that is, its point of attachment to the thorax. Thus Step II is accomplished.

Referring particularly to FIGURES 1, 4, 12 and 13, there are positioned at both sides of belt 24 the helically-shaped arms, shown generally at 62, FIGURE 1, and shown in detail in FIGURES 12 and 13. These arms 62 consist of a rod 64 supported on the frame of the machine by a pin 66 on which the arm pivots under the influence of spring 68 toward belt 24 until the arm engages a stop pin 70 likewise supported on the frame of the machine. Pin 70 is so positioned as to prevent generally the arms from passing beyond a vertical position toward belt 24. At the upper end of rod 64 is attached by screw threads 65 or otherwise a cylinder 72 the upper end of which is covered by a cap 74 through which slides a piston 76 at the upper end of which is secured a side extending head piece 78 which carries the blade 80. Piston 76 is spring biased by spring 81 in an upward direction and has a rod 82 extending downward into a cylindrical space 83, the walls of which act as a guide for piston 76 and as a stop after a predetermined downward movement of rod 82. The blade 80 is helical but has a straight cutaway portion as at 84.

When a crab begins its passage between the arms 62, each arm is in a generally vertical position and is being urged in the direction of the belt 24 and against its stop 70 by spring 68. The piston 76, which carries head 78, is in its uppermost position under the force of spring 81. As the crab enters the space between the inward and upward curving parts of the blades 80, the under lateral slopes of the carapace of the crab contact these blades at a position depending upon the size of the crab. As the crab moves on after this point of contact, arms 62 adjust themselves in position relative to the belt by the action of their sliding contacts with the under lateral slopes of the carapace and adjust themselves by these contacts to bring the upper surfaces of the blades into sliding contact with the points on the crab immediately above the points of attachment of the pair of posterior legs to the thorax of the crab. As the crab moves on, blades 80 progressively rotate downwardly the first, second and third legs and the fin on each side. Because the points of attachment of the first and second legs and the fin to the thorax are at lesser lateral distances from the median line of the crab, the blades 80 succeed in rotating the third leg only to a fully vertically downward position, at which position it is broken off at its point of attachment to the thorax. When the point of attachment of the third leg slides past the upstream end of cutaway portion 84 of blade 80, blade 80 under action of spring 68 moves inwardly and engages legs one and two and the fin. Further motion of the crab breaks legs one and two and the fin from the thorax at their points of attachment. Thus Step III is completed and the crab moves on to the end of the upper run of belt 24, indicated as at 85.

The crab continues to be moved by carriers 12 suspended from track 34, the crab being moved along in contact with slideway 86 on the upper surface of which is a ridge 88 similar in shape to ridge 22 on plate 20. Track 34 and slideway 86 curve to the left as shown in FIGURES 4 and 26 to move the crab to its point of transfer to an endless chain conveyor constituting the second conveyor system.

Referring to FIGURES 2 and 14 through 26, there is shown thereon one embodiment of the mechanisms constituting Stations IV through VII.

The conveyor system for this part of the machine consists of two sprocket wheels 90 supported on the frame of the machine and engaging an endless sprocket chain 92. To this chain are connected the carriers shown generally as at 94. The upper and lower runs of chain 92 are kept level and kept from sagging by providing shafts 96 passing through the base 98 of the carriers, on which shafts are mounted wheels or rollers 100 adapted to engage angle bars 102 forming tracks for rollers 100. The sprocket wheels 90 are driven from a source of power, such as a motor, at such a speed that the circumferences of the wheels move at the standard speed, that is, they have the same linear speed as that of cups 42 of carriers 12.

The main frame of carrier 94 consists of two parallel vertical end plates 104, with rods 106 extending therebetween, base 98 and top plate 108. In the embodiment shown in FIGURE 24, the main frame is made in one piece, but it is apparent that the several parts of the frame may be made separately and joined together by welding or otherwise. The upper surface of plate 108 is generally flat, except for ridge 110 which extends along its center line and is adapted to engage the ventral groove of the crab thorax and flat horizontally except for a downwardly sloping portion 112 extending forwardly of the leading end plate 104. See FIGURES 21 and 22.

Carriers 94 are fastened to chain 92 by brackets 114 (FIGURE 23) which are bolted to base plate 98 by bolts 116 and which are bolted to the side plate 118 of links 120 by bolts 122 which support rollers 124. The links of the chain are of such length between their pivot axes that an integral number of links are exactly equal to the standard distance between the crabs as they are being processed through the machine.

Referring particularly to FIGURES 23 and 24, the crab is held securely on top plate 108 by a plurality of fingers shown generally at 126. These fingers are mounted oppositely in pairs in blocks 128 which blocks pivot about rod 106. The fingers of each such pair are urged toward each other by springs 130. The upper ends 132 of fingers 126 are generally flat and are curved inwardly toward each other. The fingers are of such height that when moved toward a crab resting on top plate 108, the upper ends of the fingers pass under the carapace of the crab and grip the thorax. The fingers, together with ridge 110 engaging the ventral groove in the thorax of the crab, prevent lateral motion of the crab and the fingers being curved inward will, upon their engagement with the thorax, exert a force holding the crab firmly on the top plate of carrier 94.

The axial positions of blocks 128 and fingers 126 are controlled by rods 134 secured into blocks 128 on which rods are mounted roller followers 136 that engage cams 138, which in this embodiment are shown in the shape of rods which are secured by conventional means to the frame of the machine by supports 140. See FIGURE 14.

On the rear plate 104 are affixed two lugs 142 in which slides rod 144, which rod is keyed as at 146 to cooperate with grooves in lugs 142 (FIGURES 21 and 22). At the upper end of rod 144 is affixed a cross bar 148 which in its upper position is just flush with the top edge of upper plate 108. At a position on rod 144 between the lugs 142 is affixed a follower bar 150, at the outer ends of which are positioned follower rollers 152 which engage and are disengaged from the two pairs of cams 154 and 155 as the carriers 94 are moved by chain 92.

Referring particularly to FIGURES 14, 15 and 16, a disk saw 156 is mounted in the path of crabs being conveyed by carriers 95 by journalling the saw 156 at the ends of two flat bars 158, held together by bolt 160. The saw 156 is driven by a flexible shaft 162 connected to a source of power, such as an electric motor. A guard for the upper part of saw 156 is provided as at 164 by the enlarged upper halves of bars 158 at their ends. Bars 158 are pivotly secured by nut 166 to rods 168, extending from the frame of the machine, as at 169. A stop pin 172 is provided on the frame of the machine to prevent bars 158 and saw 156 from moving downwardly beyond a predetermined position.

Referring particularly to FIGURES 14 and 25, two pairs of bars, 174 and 176, are mounted on the frame of the machine as at 178. Bars 174 are closer together than bars 176. Bars 174 are pivoted at their upstream ends by pivoting these ends in block 180 and securing this block to the frame of the machine by bolts 182. The downstream ends of bars 174 are in spring contact with the frame by securing their downstream ends to block 184, which block is affixed to the top of cylinder 186. This cylinder 186 surrounds a floating, cylindrical frame-contacting member 188, which member is closed at its bottom end to contact the frame of the machine at 178. Inside cylinder 186 is a spring 189 in contact with the upper surface of member 188 and the lower inside surface of block 184. Both ends of bars 176 are secured directly to the frame of the machine by pads 190 and nuts 192 engaging threads at the ends of bars 176.

Referring particularly to FIGURES 14 and 17 through 20, a pipe 194, with groups of holes 196 therethrough, is positioned on the frame of the machine near the end of the lower run of chain 92. This pipe is connected to a source of water under pressure and as the pipe is flanged at its end, as at 198, streams of water are forced up through the holes. Between the groups of holes and above the pipe 194 are beams 200 secured to stringers 202 by screws 203. These stringers are affixed to the frame of the machine.

In the beams 200 are secured bristles 204, which may be individual bristles or tufts of bristles and made of fibers, metal or synthetic materials. In the embodiment shown in the drawings the bristles 204 become progressively longer as they approach the end of the lower run of chain 92. The bristles 204 may also vary in length crosswise to the beams 200, as shown in FIGURE 20. The bristles 204 are long enough to reach and brush the crabs as they are moved on carriers 94 by chain 92.

Referring particularly to FIGURES 5, 14 and 26, the crab, as it reaches the end of the upper run of belt 24 (FIGURE 5), is being moved by belt 24 and also by trolley carrier 12, which is moving at the same linear velocity as belt 24. When slideway 86 is reached, carrier 12 pushes the crab onto, and continues to move the crab along, slideway 86. As the upper surface of slideway 86 has a raised ridge 88 thereon, similar in shape to ridge 22 on plate 20, the crab is stabilized laterally on slideway 86. As shown in FIGURE 4, slideway 86 turns to the left and it continues in a curve until it reaches the line of carriers 94 (FIGURE 26), which are being moved on angle bars 102 by endless chain 92. As track 34 and slideway 86 reach the line of carriers 94, track 34 and slideway 86 straighten to bring the movement of the individual crabs parallel to and directly above the top plate 108 of individual carriers 94. Track 34 and slideway 86 decline downward as at 206 (FIGURE 14) and the crab, moved by carrier 12, slides off the end of slideway 86 and is deposited on the top plate 108 of an individual carrier 94. From the shape of cam 138 (FIGURE 14) it is shown that the fingers 126 are held in their open position (FIGURE 23) and as the individual carrier 94 moves on under the force of chain 92, cam 138 slopes upward to permit the fingers 126 to seize the thorax of the crab. The resilience of the springs 139 joining pairs of fingers 126 is such that when the crab thorax is seized by the fingers and the track begins to slant upward, as at 208 (FIGURE 14), the crab is disengaged from cup 42 of carrier 12 and is held firmly by fingers 126 of carrier 94. The crab is stabilized transversely by the ventral groove in the thorax of the crab engaging the ridge 110 on the top plate 108 of carrier 94.

As the crab proceeds on the upper run of chain 92, its carapace meets saw 156. The bars 158 supporting this saw are heavy enough to keep the saw cutting through the carapace and the end parts of the lower sides of plates 158 keep the saw from cutting too deeply into the crab.

As a crab approaches and engages the two sets of bars 174 and 176, the outer ends of the carapace, which has been cut along its median line by saw 156, will be forced upward and will be broken away from the rest of the body of the crab. The resilience of spring 189 is such that when a small crab is in sliding contact with bars 174, upward forces will be exerted sufficient to break the severed halves of the carapace from the body of the crab, but when a larger crab is passing this Station IV and greater bending moments are needed to break the halves of the carapace away from the crab body, the carapace passes over and depresses bars 174 against the force of spring 189 and then contacts bars 176, which bars are separated a greater distance from each other than bars 174 and exert greater bending moments as their leverage length is greater and they are affixed solidly to the frame of the machine.

When the rear part of a carrier 94 reaches a point indicated by 210 (FIGURE 14), rollers 152 on bar 150 engage cams 154 and as the carrier moves with chain 92 on its lower run, bar 148 remains even with the top plate 108 of the carrier. When the rear part of the carrier passes the end of cams 154 as indicated at 212, bar 148 drops down by its own weight, and the weight of parts attached thereto, to wipe from the crab any part of the abdomen that was not removed from the crab as it passed over chute 18 at Station I. When the rear part of the carrier reaches point 214, rollers 152 engage cams 155 and bar 148 is moved back to its original position relative to the top plate 108 of carrier 94.

With the carapace removed from the crab, its internal organs, including the gills, masticating and other organs are exposed. These organs are removed by the crab passing over and in contact with the series of bristles or bundles of bristles 204, as shown in FIGURES 17 through 20. At the same time that the bristles are in contact with the crab, water supplied through pipe 194 and forced through groups of holes 196 washes the crab free from the parts of the organs that have been loosened and torn away from the body of the crab.

As the crab leaves Station VII, all that remains of its body is a clean thorax with claw, leg and fin knuckles attached.

It will be noted that Steps IV, V, VI and VII are performed at stations on the under side of a conveyor system and the crab is in an inverted position, enabling gravity to greatly facilitate the removal of the interior organs from the crab and to cause such organs as are removed to fall clear of the machine.

As the rear side of a carrier 94 reaches point 216 (FIGURE 14), rollers 136 again contact cam 138 and fingers 126 start to spread apart and move away from the thorax of the crab. At the same time, a third conveyor system driven by a source of power such as a motor, moves a series of trolley carriers 218, suspended from track 220, directly over the thoraxes, which are still on carriers 94, the carriers 218 moving at a linear velocity equal to that of carriers 94 and at such a height above the top plates 108 that carriers 218 contact the thoraxes with such pressure that carriers 218 control the movement of the thoraxes. As the forward edge of carrier 94, with a thorax upon its top plate 108, and trolley carrier 218, in firm contact with the same thorax, simultaneously reach point 222 (FIGURE 14), the thorax is slid onto slideway 224. This slideway is provided with a longitudinally central ridge 226, giving lateral stability to the thorax as the thorax is moved along slideway 224. As seen in FIGURE 26 trolley carriers 218 of the third conveyor system are guided off to the right as they follow the curvature of track 220 and of slideway 224 so as not to interfere with trolley carriers 12 of the first conveyor system moving crabs along slideway 86 for transfer to carriers 94 of the second conveyor system.

The remaining steps in the processing of crabs in accordance with my invention (Steps VIII through XI) are accomplished by mechanisms shown generally in FIGURE 3. These mechanisms include a fourth conveyor system consisting of a turret 228 adapted to move a plurality of equally-spaced conveyor arms 230 (fifteen, in the present embodiment) in circular paths, in which arms are positioned a plurality of carriers 232. The upper portion 234 of carrier 232 includes an anterior gripper 236 and a posterior gripper 238 that hold between them the crab thorax being moved by the carrier. Mounted upon the carrier and upon conveyor arm 230 are cam followers that cooperate with cams and other surfaces mounted on the frame of the machine to rotate the carrier about its vertical axis and to also radially extend or retract the carrier so as to present a thorax on the carrier to a plurality of band saws at such angles and at such distances as to cut the thorax proportionally in accordance with its size along predetermined planes. The approach of the thorax along slideway 224 of the third conveyor system to and onto carriers 232 of the fourth conveyor system is indicated in FIGURE 3 and the path of the thorax thereafter as it is moved by a carrier past the band saws is indicated by dash line 242.

In defining the relative positions of the several parts making up or moving on or with turret 228 and the positional relations of these parts to other parts mounted on the frame of the machine, it will be convenient to indicate such relative positions as lying on a radius, with the turret axis as a center, which radius is designated by a number (indicating degrees) increasing clockwise from 0, which designation is assigned to an arbitrarily selected reference radius. The radius thus designated radius 0 is that radius delineating the end of slideway 224, at which radius the crab thoraxes have been transferred from slideway 224 to carriers 232 to begin their clockwise circuit about the axis of turret 228.

Referring to FIGURE 3, band saws 366, 368, 370 and 372 are mounted in respective frames 374 on respective idler and drive wheels 376 on respective standards 378 secured to the frame of the machine and driven by respective motors 380. Saws 366 and 370 are mounted to cause the right and left vertical trimming cuts respectively and saws 368 and 372 are mounted to cause the right and left inclined sectioning cuts respectively to be made on thoraxes carried by carriers 232. Band saw 366 is mounted at radius 80, saw 368 to radius 125, saw 370 at radius 195 and saw 372 at radius 240.

Referring particularly to FIGURES 3, 27, 32, 34 and 36, turret 228 consists of a generally flat top 244, with two raised portions or rings 246 and 248. Top 244 is supported and rotated by a vertical shaft 250, which shaft extends downward through a collar 252 to which it is attached, through bearing block 254 set into a depression in the base 256 of the machine, through base 256 and to other bearing blocks, not shown. Immediately below base 256 is affixed gear 258, which is connected to a source of power, such as an electric motor. The weight of the turret is supported by triangular brace plates 260 that engage collar 252. The weight of plates 260 may be reduced by conventional lightening holes as at 262.

Figure 32:
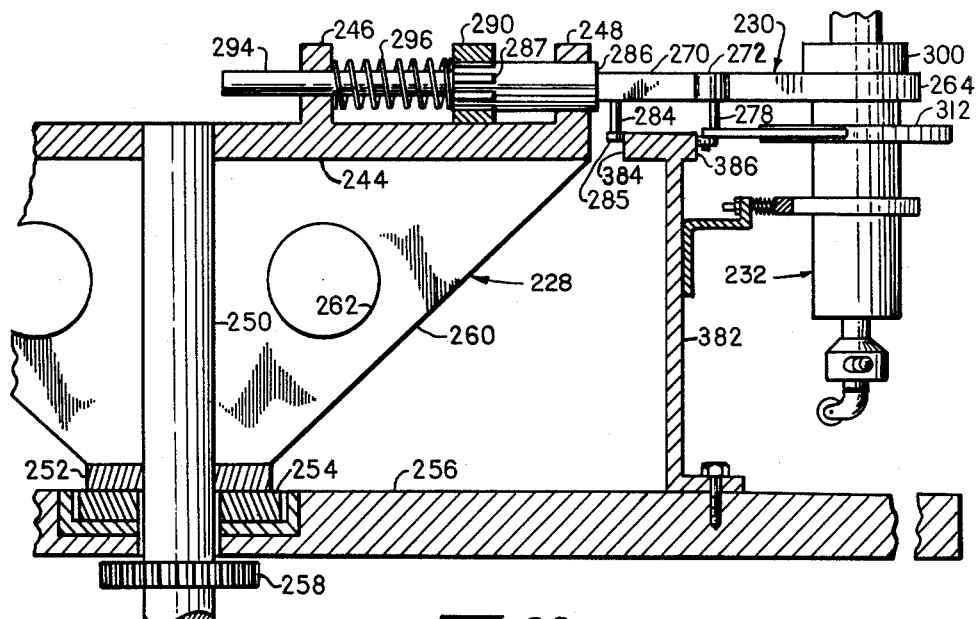
FIGURE 32 is a partial vertical cross section view of the turret and the cam cylinder, with side elevation views of a conveyor arm and a carrier, shown with the carrier in its rotating condition.

A conveyor arm (FIGURE 28), shown generally as 230, consists of a flat and expanded outer portion 264, in which is a hole 266, through which hole passes carrier 232. Carrier 232 is held in position on portion 264 by collar 300. Inward from outer portion 264 is a second flat portion 270 with a lug extension 272 in which are bored two holes: 276 through which is secured pivot pin 278; and 280 through and extending below which is secured stop pin 282 (FIGURE 36). A hole 283 is bored in portion 270 through which is secured a cam follower pin 284 with its roller 285 (FIGURES 32, 34 and 36).

Inward of portion 270 is a cylindrical portion 286 adapted to slide in a bearing in ring 248 of the turret top 244. The inward part of portion 286 is splined as at 287 to fit securely into grooves 288 in block 290 (FIGURE 35), which block has a flat lower surface at 292. The inner end of arm 230 is cylindrical as at 294 and fits into a bearing in ring 246. A spring 296 is placed between ring 246 and block 290. It is apparent that arm 230 may slide away from and toward the center of the turret under the force of spring 296 and as governed by cam follower 285. It will be noted that because of the flat lower surface 292 of block 290, which surface is in direct contact with the upper surface of turret top 244, the conveyor arm 230 is prevented from turning about its axis, that is, about the axis of cylindrical portions 286 and 294.

The distance from the centers of the holes 266 in arms 230 to the vertical axis of turret 228, when the arms are in their innermost positions, is such that the arcual distance between succeeding centers of holes 266 is the standard distance between carriers in the four conveyor systems of the machine and also such that an integral number of arms exist in this turret conveyor system. The arcual linear velocity of centers of holes 266, when in their innermost positions, is equal to the standard linear velocity of the other conveyor systems of the machine.

Referring particularly to FIGURES 3 and 29 through 32, the carrier 232 consists of a cylindrical shell 298 terminating at its upper end in collar 300. Cylinder 298 is passed downwardly through hole 266 in flat outer part 264 of arm 230 until the under surface 302 of collar 300 engages the upper surface of part 264. The lower end of shell 298 is closed by plate 304 through which is drilled a hole 306, with a keyway groove, to accommodate shaft 308 and key 310. Secured to the outside of shell 298 by welding or otherwise is carrier locking collar 312. Also, secured to the outside of shell 298 by welding or otherwise, is carrier rotating collar 313.

Inside shell 298 is positioned the carrier pedestal shown generally as 314, which pedestal is secured to shell 298 by pins (not shown) passing through the pedestal and pin holes 316. To the pedestal 314 is secured pedestal front 318 by bolts 322. In pedestal 314 and front 318 are formed journals to support rotatable shafts 324 on which are mounted two pairs of gears, 326 and 328, respectively (FIGURE 31). The gears 326 mesh with toothed bar 330, which bar is an upper extension of shaft 308. Shaft 308 extends downward through plate 304, through block 332 and terminates as caster 334 and its roller 336 secured thereto by pin 338. Roller 336 engages cam 340 secured to the frame of the machine.

The downward movement of shaft 308 is limited by block 342 affixed to shaft 308 contacting the upper surface of plate 304 at surface 344. The upward movement of shaft 308 is limited by the greatest height of cam 340, which is such as to raise block 332 until just short of contact with the lower surface 346 of plate 304. Block 332 cam follower is shown generally at 348.

The upper surface 350 of pedestal 314 includes a ridge 352, similar to ridge 22 on plate 20, to ridge 23 on belt 24, to ridge 88 on slideway 86, to ridge 110 on top plate 108 of carrier 94, and to ridge 226 on slideway 224. This ridge cooperates with the ventral median groove of a crab thorax when placed on top 350, to provide lateral stability of the thorax on the pedestal.

The mechanism in the pedestal to seize, hold and release the thorax of the crab consists of the two grippers 236 and 238 (FIGURES 43 to 46, incl.) together with parts that cooperate therewith. The anterior gripper 236 is grooved as at 362 (FIGURE 3) to engage the relatively sharp anterior portion of the crab thorax and the engaging surface of the posterior gripper 238 is made in the form of a wedge, as at 364 (FIGURES 29 and 30), to cooperate with the relatively recessed posterior central portion of a crab thorax. The shapes of the contact surfaces of these grippers thus further enhance the lateral stability of a crab thorax on pedestal 314.

The anterior gripper 236 and the posterior gripper 238 are vertically mounted on horizontally guided bars 353 and 354, respectively. Teeth are cut in bars 353 and 354 to mesh with gears 356 and 358, respectively. Gears 356 and 358 are positioned to engage teeth on bar 360 that extends downward between front 318 and pedestal 314 to engage the gears 328, which gears are mounted on shafts 324 in common with gears 326, which gears engage toothed bar 330, which bar is an upper extension of shaft 308. It will thus be apparent that motion up or down of shaft 308 relative to pedestal 314 will produce motion of grippers 236 and 238 away from or toward pedestal 314. It is further apparent that the ratio of the distance moved up or down of shaft 308 to the distance moved away from or toward pedestal 314 of either gripper 236 or gripper 238 is the same as the ratio of gears 326 to gears 328 (which ratio in the embodiment shown is 3 to 1). Thus, for example, as the size of the thorax on upper surface 350 decreases and there results thereby a downward movement of shaft 308 and follower 348, the amount of such downward movement will be three times the decrease in the half median length of the thorax as measured between grippers. The blocks 332 and 342 on shaft 308 and bars 330 and 360 are of sufficient weight to move downwardly by themselves under the force of gravity and by such movement to cause the grippers to approach one another to therebetween grasp and hold the thorax. Movement downwardly of shaft 308 and of these blocks and bars and movement upwardly of shaft 308 and of these blocks and bars, which upward movement effects release of the thorax, is affected as caster 334 follows the decreasing and increasing heights of cam 340, respectively.

Cam 340, as shown in FIGURE 3, is arcuate form and is positioned on the frame of the machine directly under the path of roller 336 of caster 334 in the sector extending from radius 266 to radius 30 (FIGURE 27), during the passage through which sector the grippers release one thorax, this thorax is ejected, and the grippers then grasp another thorax. The height of cam 340 is such that, except at its downwardly tapered ends, roller 336 and shaft 308 are in their high positions, with block 332 just short of contact with surface 346 and with grippers 236 and 238 separated to their widest opening.

Referring to FIGURES 3, 32 and 34, cam cylinder 382, mounted on the frame of the machine, extends upward to a height just below the lower surfaces of conveyor arms 230. The upper portion of cylinder 382 is extended horizontally to form, on the inner and outer surfaces thereof respectively, cams 384 and 386. Cam 384 cooperates with follower 285 on arm 230 to permit spring 296 to force arm 230 outwardly or to move arm 230 inwardly against the force of spring 295. Cam 386, cooperating with follower 388 on lever 390, which is mounted on pivot pin 278, moves lever 390 into locked and unlocked positions with notches 392 in locking collar 312 (FIGURE 36), which collar is mounted on carrier 232. To assure that arm 230 can not move outwardly unless the outer engaging end 394 of lever 390 is within one of the notches 392, safety rod 396 is mounted on ring 248 with the outer end 398 of rod 396 bent downward to a position outward of and in line, when lever 390 is in its disengaged position, with end 394 of lever 390.

On the sides of cam cylinder 382 are mounted brackets 400 on which are attached, by bolts 402 and springs 406, arcuate bars 404, the ends of which bars are chamfered as at 408 (FIGURE 33). Bars 404 are positioned above the base of the machine at the level of collar 313 on carrier 232 and are positioned outward from cylinder 382 at such a distance as to effectively frictionally engage collar 313 and thereby rotate this collar and carrier 232 about their axis through a definite number of degrees determined by the duration of rolling contact of collar 313 with bars 404. Bars 404, positioned with their contact surfaces extending from radius 30 to radius 49, from radius 150 to radius 166 and from radius 265 to radius 266, effect clockwise rotations of carrier 232 of 190 degrees, 160 degrees and 10 degrees, respectively.

Referring particularly to FIGURES 3, 27, 34 and 37 through 42, four cams 410, 412, 414 and 416, which are arcuate in shape, are mounted on the frame of the machine concentric with turret 228 and in the sectors in which vertical and inclined cuts are made on the thoraxes carried by pedestals 314. These cams, when carriers 232, urged by springs 296, move outwardly until followers 348 contact cam working surfaces 426, act to fix the radial positions of individual carriers carrying individual thoraxes and thereby fix the distances at which the individual thoraxes pass the saw blades, these individual passing distances being such as to effect the same optimum proportional cuts on all thoraxes carried, regardless of size. Cams 410 and 414 govern extension of carriers 232 in the sectors of the right and left vertical cuts, respectively, and cams 412 and 416 govern extension of carriers 232 in the sectors of the right and left inclined cuts, respectively. Cam 410 extends from radius 55 to radius 100; cam 412 from radius 100 to radius 145; cam 414 from radius 170 to radius 215; and cam 416 from radius 215 to radius 260.

The working surfaces 426 of these cams may be defined as sectors of the interior surfaces of truncated right circular cones concentric with the axis of turret 228, there being one slope of cone in the case of vertical cut cams 410 and 414 and a second slope of cone in the case of inclined cut cams 412 and 416. The correct slope in the case of the vertical cut cams 410 and 414 is a slope such that its vertical component has a ratio to its horizontal component, which ratio is that existing between 3 times the half median length of a particular thorax on pedestal 314 and the distance at which that same thorax passes the vertical saw to effect the optimum vertical cut, a distance measured from the carrier axis to the vertical saw. Because the proportions of all Blue Crabs are the same, varying only slightly between sexes, the ratio thus determined may be regarded as constant for all Blue Crabs. It has been found to be 3 to 1.18, a ratio which results in a conical slope making an angle to the vertical of approximately 21½ degrees for working surfaces 426 of vertical cut cams 410 and 414. The correct slope in the case of the inclined cut cams 412 and 416 in a slope such that its vertical component has a ratio to its horizontal component, which ratio is that existing between 3 times the half median length of a particular thorax on pedestal 314 and the distance at which that same thorax passes the inclined saw to effect the optimum inclined cut, a distance measured along the central plane of the thorax from the intersection of the carrier axis with that plane to the intersection of the inclined saw with that plane. It has been found (where, as in the present embodiment, the inclined cuts are made at an inclination of 45 degrees to the vertical) to be 3 to 1.68, a ratio which results in a conical slope making an angle to the vertical of 29¼ degrees for working surfaces 426 of inclined cut cams 412 and 416.

It will be noted that the multiplication of the vertical movement of carrier shaft 308 by reason of the ratio (3 to 1 in the present embodiment) between gears 326 and gears 328 results in steepening the working surfaces 426 of cams 410, 412, 414 and 416 to thereby enhance the facility with which these cams cooperate with followers 348.

Figures 29, 30, 30A:
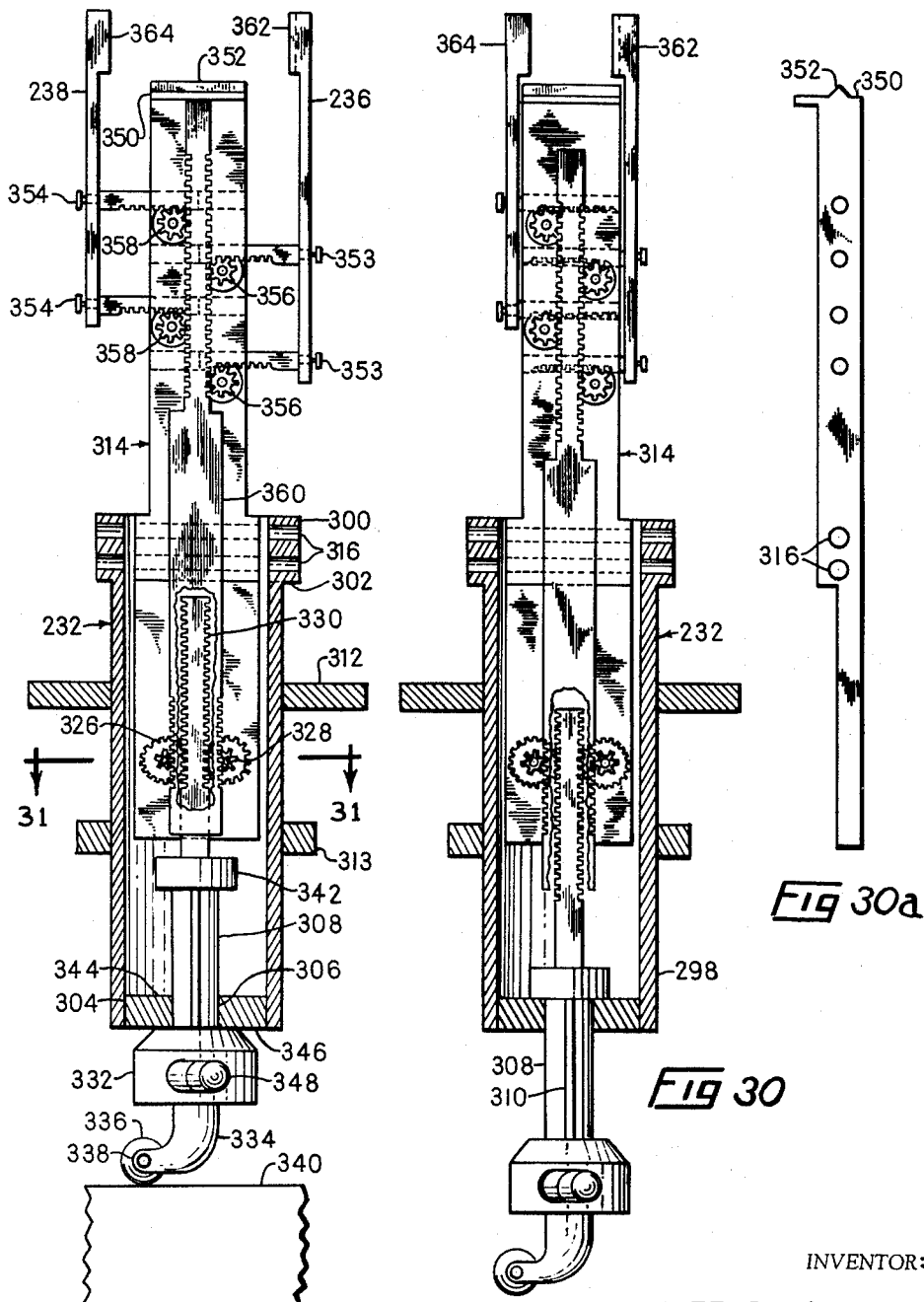
FIGURE 29 is a side elevation view of a carrier of the conveyor system shown in FIGURE 27, with the pedestal front removed and the cylindrical carrier shell shown in cross section, when the vertical carrier shaft is in its highest position.
FIGURE 30 is a side elevation view of a carrier of the conveyor system shown in FIGURE 27, with the pedestal front removed and the cylindrical carrier shell shown in cross section, when the vertical carrier shaft is in its lowest position.
FIGURE 30a is a side elevation view of the pedestal.

Representative of cams 410, 412, 414 and 416 and as best shown in FIGURE 34, the cam consists of a base portion 418 which forms a structure by which the cam is held to the frame 420 of the machine, as by bolts 422, and which forms a support for the upper or working portion 424 of the cam. A clearance space below the working surface 426 of the cam is thus provided for roller 336 to clear frame 420 when shaft 308 is in its lowest operating position, as shown in FIGURE 30. The vertical height of upper portion 424 is slightly greater than the range of vertical movement of shaft 308.

From the distances of the various knuckles of the crab from its median plane, it has been found that the optimum angle between the plane of a vertical cut and the median plane of the thorax is approximately ten degrees, the planes of the right and of the left cuts converging on the median plane forward of the anterior end of the thorax. Cuts made in these planes sever away most of the claw knuckles and all of the leg knuckles. The right and left inclined cuts are taken at the same azimuth angles of the thorax relative to the instantaneous direction of movement of carrier 232 as the right and left vertical cuts, respectively, but the planes of these cuts are at angles to the vertical, sloping from over the thorax radially downward and outward therefrom. An inclination of forty-five degrees has been found to be practical in order to sever the dorsally-located extensor muscles from the ventrally-located flexor and fin muscles. In order to effect the two right cuts in the correct planes, the thorax (when, as in the present embodiment, revolution of turret 228 is clockwise) is carried past right-cutting saws 366 and 368 with its right side facing radially outward, its posterior leading, and its median plane rotated clockwise about the vertical axis of the carrier ten degrees beyond its tangency with the circle of revolution of the axis. In order to effect the two left cuts in the correct planes, the thorax (when, as in the present embodiment, revolution of turret 228 is clockwise) is carried past left-cutting saws 370 and 372 with its left side facing radially outward, its anterior leading, and its median plane rotated clockwise about the vertical axis of the carrier until ten degrees before attaining tangency with the circle of revolution of the axis. It will be noted that, for all cuts, anterior gripper 236 and the anterior end of pedestal 314, whether following, as in the cases of the two right cuts, or leading, as in the cases of the two left cuts, pass nearer to the saws than do posterior gripper 238 and the posterior end of pedestal 314. However, the grippers and the pedestal are sufficiently narrow to assure their clearance when passing the vertical saws, even when a thorax of minimum size is being carried and their clearance is the least. Hence, because their clearance increases, by the cooperation of follower 348 with working surfaces 426 of cams 410 and 414, as the size of the thorax increases, they will pass clear of the vertical saws when carrying a thorax of any size. Thus, variation of the radial distance of carrier 232 while the grippers and the pedestal are passing the vertical saws is unnecessary and working surfaces 426 of right vertical cut cam 410 and of left vertical cut cam 414 are uniform throughout their lengths, as shown at their ends in FIGURES 37 and 40.

The vertically-extending grippers 236 and 238 and the vertically-extending pedestal 314 parallel vertical saws 366 and 370 and it is therefore only necessary, when the grippers and the pedestal pass the vertical saws as just described, that there be sufficient lateral clearance. However, when the grippers and the pedestal pass inclined saws 368 and 372 there must, in addition to lateral clearance, be sufficient overhead clearance. The grippers and the pedestal are sufficiently narrow and, with the single exception of anterior gripper 236, their tops are sufficiently low to clear the inclined saws, if extension of the carrier were governed solely by the cooperation of follower 348 with working surfaces 426 of cams 412 and 416. However, if extension of the carrier were governed solely by the cooperation of follower 348 with working surfaces 426 of cams 412 and 416, anterior gripper 236 would, in the cases of thoraxes of the smaller sizes, make contact with saw 368 after completion of the right inclined cut and would make contact with saw 372 before the start of the left inclined cut. Such contacts with the inclined saws would be made at the upper end of the anterior gripped within that range of heights at which this gripper grips thoraxes of the larger sizes.

To prevent contact between anterior gripper 236, in the cases of thoraxes of the smaller sizes, and saw 368, which saw performs the right inclined cut, carrier 232 must, immediately after the cut, begin movement radially inward, and must complete such movement before anterior gripper 236 passes saw 368, the amount of this movement radially inward being varied in accordance with the size of the thorax being carried to provide the necessary clearance. The requisite movement radially inward is greatest when the size of the thorax is least and diminishes as the size of the thorax increases, until the thorax attains a certain size, above which size of thorax the anterior gripper will clear saw 368 without movement of carrier 232 radially inward and such movement becomes unnecessary. The movement of carrier 232 radially inward is accomplished by increasing the horizontal thickness of cam 412, followed by follower 348, as at 428, FIGURES 38 and 39, such increase starting at point 430 and being completed before the anterior gripper passes saw 368, an event occurring at its earilest with the smallest thorax, when the greatest radial movement inward is required, and occurring later with a larger thorax, when the least radial movement inward is required. Hence, as shown in FIGURE 38, as the level of follower 348 rises with an increase in the size of the thorax, the movement of carrier 232 radially inward diminishes and such diminished movement begins later.

To prevent contact between anterior gripper 236, in the cases of thoraxes of the smaller sizes, and saw 372, which saw performs the left inclined cut, carrier 232 must, before the cut, be held radially inward a sufficient distance to provide clearance as anterior gripper 236 passes saw 372, immediately after which carrier 232 is extended to the correct distance and the left inclined cut is then made. This sequence of events is accomplished by increasing the horizontal thickness of cam 416, followed by follower 348, as at 428, FIGURES 41 and 42, and maintaining this increased thickness until just after the anterior gripper passes saw 372, whereupon as at 432, the thickness of cam 416 diminishes and permits follower 348 to contact and then follow working surface 426.

After the crab has been steamed, it is placed on belts 2 and 14 with its anterior portion touching paired projections 10 on belt 2. This positioning assures that the movement of the crab throughout the machine will be synchronized both as to time and position in space with the carriers of each of the four conveyor systems of the machine.

As the crab approaches plate 20, a cup 42 on trolley carrier 12 of the first conveyor system lowers to contact the carapace of the crab and moves the crab along plate 20 to belt 24. As the crab passes over chute 18, its abdomen is pulled downwardly by a suction force and pivots on the posterior end of the thorax, which is the line of attachment of the abdomen, thus exposing the ventral median groove in the thorax of the crab. As the crab passes over the end wall of chute 18, portions of the abdomen may fall through the chute and portions of the abdomen may drag along on belt 24 with the rest of the body of the crab. Thus Step I of the processing of the crab is completed.

As the crab is carried along on belt 24 and under the impulsion of carrier 12, the crab meets the pair of arms 54 which bend down and break off the claws of the crab at their knuckles. This completes Step II.

The crab is then carried into contact with arms 62, which bend down and break off the three pairs of legs and the fins of the crab at their knuckles. This completes Step III.

The crab is then impelled by carrier 12 from belt 24 onto and along slideway 86 and its ridge 88, which ridge cooperates with the thoracic groove of the crab to enhance lateral stability of the crab on the slideway. The carrier 12 is synchronized in time, space, direction and velocity with carriers 94 of the second conveyor system so as to deposit the crab on the top plate 108 of a carrier 94 when the fingers 126 are in their open positions under the effect of cams 138. As the crab moves forward, fingers 126 close on the crab, carrier 12 rises to release its contact with the carapace and the crab is carried along the upper run of endless chain 92 by a carrier 94. Carriers 12 continue their paths for a short distance before they turn off to the left and return to the position above belt 2, to complete their continuous circuit. Near the end of the upper run of chain 92, the median line of the crab carapace meets saw 156, which cuts through the carapace, which is removed by bars 174 or 176. This completes Step IV.

The crab then continues along the lower run of chain 92 until rollers 152 on bar 150 reach the point 212 at the ends of cams 154, permitting cross bar 148 to move downwardly and sever any remaining parts of the crab abdomen from the thorax. This completes Step V.

With its carapace removed, the masticating and internal organs and the gills of the crab are exposed. These parts are removed by bristles and a water spray. Step VI and Step VII are thus completed.

The thorax then reaches the end of the lower run of chain 92 and is carried to the first part of the upper run of chain 92, where it is transferred to a trolley carrier 218 of the third conveyor system, consisting of trolley carriers 218, track 220 and slideway 224. The cups of carriers 218 may be smaller than cups 42 as the size of the crab has been reduced to that of its thorax by the removal of its carapace and other members. Track 220 and slideway 224, as indicated at 434 (FIGURE 27), guide carriers 218 in a path away from carriers 94 to a path tangent to the circle of movement about the axis of turret 228 of carriers 232 of the fourth conveyor system. Slideway 224 is at such a height above the base of the machine that its under surface just clears the upper ends of grippers 236 and 238 and is curved as at 436 to the curvature of the circle of travel of carriers 232 so that as its end is reached, as at 438, the thorax slides off the slideway and down onto the pedestal top 350 of a carrier 232. The end of the slideway, 438, is at the 0 radius of carriers 232. Carriers 218, guided by track 220, continue in their arcuate paths for a short distance before they turn off to the right and return to the position above carriers 94, to complete their continuous circuit.

As the thorax slides off slideway 224 at radius 0, a conveyor arm 230 is passing radius 0 (FIGURE 3) in its innermost radial position, where the actual distance between succeeding carrier axes is the standard distance, and roller 336 on shaft 308 is riding on the highest surface of cam 340, so that grippers 236 and 238 are separated to their widest opening. Thus carrier 232 is ready and receives the crab thorax, the anterior end of which thorax is opposite the anterior gripper 236 and the posterior end of which is opposite posterior gripper 238 and the ventral groove of which engages ridge 352 on the upper surface of pedestal top 350.

As carrier 232 is moved beyond radius 0 and reaches radius 5, as at 440 (FIGURE 3) the upper surface of cam 340 starts sloping downwardly and roller 336 starts to sink downwardly. At some point between radius 5 and the full decline of cam 340 at radius 30 (442, FIGURE 3) shaft 308 has sunk to a position and has lowered bar 360 to a position such that grippers 236 and 238 have come into holding contact with the crab thorax, the extent of the lowering of bar 360 being dependent upon the size of the particular thorax being held by the grippers.

Just before the vertical axis of carrier 232 reaches radius 30, follower 388 contacts cam 386 and moves lever 390 to unlock carrier 232. As the vertical axis of carrier 232 passes radius 30, rotation collar 313 contacts bar 404 and further arcuate movement of carrier 232 rotates carrier 232 clockwise about its vertical axis. The arcuate length of bar 404 is such that carrier 232 completes a clockwise rotation of 190 degrees as its vertical axis reaches radius 49. Upon movement of carrier 232 beyond this point, rotation collar 313 disengages bar 404, roller 388 disengages cam 386 and lever 390 moves to lock the carrier in its axial position for both the right vertical and the right inclined cuts.

As the carrier, locked in this axial position, with the right side of the thorax facing radially outward, with the posterior end of the thorax leading and with the medium plane of the thorax rotated clockwise ten degrees beyond its tangency with the circle of revolution of the carrier axis as indicated by arrow 444 (FIGURE 27), moves beyond radius 55, arm 230, with follower 285 engaging cam 384, moves outward under the force of spring 296 until follower 348 engages surface 426 of right vertical cut cam 410 to limit the radial outward movement of carrier 232 according to the size of the thorax on the carrier. The thorax, thus correctly positioned for the optimum trimming away of its right leg knuckles, that is, positoned at the correct radial distance for a thorax of its particular size and at the correct axial angle, is carried past vertical saw 366 at radius 80, these knuckles are trimmed away by the right vertical cut, and Step VIII is thus completed.

As carrier 232 moves on between radius 85 and radius 100, arm 230 is retracted inwardly against the pressure of spring 296 by the action of follower 285 following cam 384, thus disengaging follower 348 from surface 426 of right vertical cut cam 410, and then, as carrier 232 moves on beyond radius 100, arm 230 is extended outwardly by spring 296, as follower 285 follows cam 384, until follower 348 engages surface 426 of right inclined out cam 412. The thorax thus correctly positioned for its optimum cutting by inclined saw 368, is carried past saw 368 at radius 125 (FIGURES 34 and 43) and the right inclined cut is effected. This cut severs from the thorax the right dorsal slope of chitin to which remain attached the right extensor muscles lying immediately thereunder and thereby completes Step IX. The severed section falls below into a hopper (not shown) from which it is subsequently removed for easy recovery of its meat.

Immediately after the completion of the right inclined cut, in case a thorax of a smaller size is being carried, inward retraction of carried 232 is begun by follower 348 following the beginning of surface 428 of cam 412 and, in order that anterior gripper 236 will clear inclined saw 368, this retraction is completed before the anterior gripper passes the saw (FIGURE 44). In case a thorax of a larger size is being carried, the level followed by follower 348 is above the level of surface 428 of cam 412, hence follower 348 continues to follow surface 426 after the completion of the inclined cut and there is no retraction of the carrier immediately before the anterior gripper passes the inclined saw.

As carrier 232 moves from radius 130 to radius 145, arm 230 is retracted to its innermost radial position by follower 285 on arm 230 following cam 384 and follower 348 is thereby disengaged either from surface 428 of cam 412, in case a thorax of a smaller size is being carried, or is disengaged from surface 426 of cam 412, in case a thorax of a larger size is being carried.

The actions in preparation for (FIGURE 36) and accomplishing the cuts on the left side of the thorax next follow. Just before the vertical axis of carrier 232 reaches radius 150, follower 388 contacts cam 386 and moves lever 390 to unlock carrier 232. As the vertical axis of carrier 232 passes radius 150, rotation collar 313 contacts bar 404 and further arcuate movement of carrier 232 rotates carrier 232 about its vertical axis. The arcuate length of bar 404 in this case is such that carrier 232 completes a clockwise rotation of 160 degrees by the time its vertical axis reaches radius 166. Upon movement of carried 232 beyond this point, rotation collar 313 disengages bar 404, roller 388 disengages cam 386 and lever 390 moves to lock the carrier in its axial position for both the left vertical and the left inclined cuts.

As the carrier, locked in this new axial position, with the left side of the thorax facing radially outward, with the anterior end of the thorax leading and with the median plane of the thorax rotated clockwise until ten degrees before attaining tangency with the circuit of revolution of the carrier axis as indicated by arrow 446 (FIGURE 27), moves beyond radius 170, arm 230, with follower 285 engaging cam 384, moves outward under the force of spring 296 until follower 348 engages surface 426 of left vertical cut cam 414 to limit the radial outward movement of carrier 232 according to the size of the thorax on the carrier. The thorax, thus correctly positioned for the optimum trimming of the leg knuckles from its left side by vertical saw 370, is carried past saw 370 at radius 195, these knuckles are trimmed away by the left vertical cut, and Step X is thus completed.

As carrier 232 moves on between radius 200 and radius 215, arm 230 is retracted inwardly against the pressure of spring 296 by the action of follower 285 following cam 384, thus disengaging follower 348 from surface 426 of left vertical cut cam 414, and then, as carrier 232 moves on beyond radius 215, arm 230 is extended outwardly by spring 296, as follower 285 follows cam 384, until follower 348 either immediately engages surface 426 of left inclined cut cam 416 in case a thorax of a larger size is being carried, or first engages surface 428 of left inclined cut cam 416, in case a thorax of a smaller size is being carried. In case a thorax of a smaller size is being carried, follower 348 follows the lesser radius of surface 428 to thereby restrain carrier 232 from extension until after anterior gripper 236 has passed clear of inclined saw 372 (FIGURE 45), whereupon follower 348 follows the increasing radius of surface 428 until it joins surface 426, which surface follower 348 follows as the thorax is carried past saw 372 at radius 240 (FIGURES 3 and 46) and the left inclined cut is effected. This cut severs from the thorax the left dorsal slope of chitin to which remain attached the left extensor muscles lying immediately thereunder and thus completes Step XI. This severed section, as did the right severed section, falls below into a hopper from which it is subsequently removed for the recovery of its meat.

With the completion of Step XI, that part of the thorax remaining on the carrier consists of the ventral plate of chitin, to the upper surface of which are attached the flexor muscles of the pair of claws and of the three pairs of legs and the muscles of the pair of fins. The individual flexor muscles and the fin muscles are separated from one another by radiating septa of chitin which are attached to the ventral plate and extend therefrom roughly vertically. The fin meat, lying between its septa, is exposed from above and is easily removable, as a separate grade, in its usual large segments, upon ejection of the thorax from the machine. The meat comprising the flexor muscles of the claws and legs, separated by their septa, is exposed from above and by the severance of most of the claw knuckles and all of the leg knuckles is also exposed laterally and as a result, upon ejection of the thorax from the machine, is easily removed.

As carrier 232 moves from radius 245 to radius 260, arm 230 is retracted to its innermost radial position by follower 285 on arm 230 following cam 384 and thereby disengages follower 348 from surface 426 of left inclined cut cam 416.

Between radius 265 and radius 266, carrier 232 is unlocked as previously described, rotated ten degrees clockwise, and locked in an axial position such that the median plane of the thorax carried is tangent to the circle of revolution of the vertical axis of the carrier and the anterior end of the thorax leads.

The incline of the upper surface of cam 340 extends from radius 266, as indicated at 448, to radius 325, as indicated at 450. At some intermediate radius, depending upon the size of the thorax on the carrier, roller 336 contacts cam 340 and the roller and shaft 308 are moved upward to move grippers 236 and 238 to their maximum positions apart, to release the thorax held therebetween.

Mounted at radius 330 and at the same level as the carried thorax, is a solenoid-operated plunger 452 (FIGURES 3 and 27), which is connected to a source of electric power by cable 454 and operated by a conventional trip switch, not shown. The plunger is moved outward as the carrier grippers are in their extended positions and ejects the thorax from the carrier. The carrier is then in a condition, as it again arrives at radius 0, to receive another thorax.

While the preferred embodiments of the invention have been illustrated and described by way of examples, it is obvious that changes may be made therein within the spirit and scope of the invention and, therefore, the invention is not to be limited to the precise forms herein disclosed. As examples of such changes, it may be advisable, as when processing crabs of the same or a different species, to alter the number and forms and positions of the saws and the angles at which the various cuts are effected or, when processing crabs of certain sizes, the anterior and posterior grippers associated with the turret carriers may be made of such heights as to clear the associated thorax sectioning saws, in which case the conical form of the working surfaces of all of the arcuate cams associated with the followers on said carriers may have uniform upward and inward slope throughout their arcuate lengths. Also, it may be desirable under some circumstances to perform stripping and cleaning Steps I to VII, inclusive, aboard a pick-up boat, to then cease further processing, and to perform the later steps after landing the partially processed crabs ashore.

I claim:

1. In a machine for processing a crab: a conveyor system including a plurality of carriers; each of said carriers including means for holding and conveying the crab; and means mounted on each side of said conveyor means and proximate to the path of the carriers of said conveyor system for breaking off the claw, leg and fin members of the crab at the knuckles thereof.

2. In a machine for processing a crab: a conveyor system including a plurality of carriers; each of said carriers including means for holding and conveying the crab; a first means mounted in the path of the carriers for breaking off the claws of said crab at the knuckles thereof; and a second means mounted in the path of said carriers for breaking off the legs and fins of said crab at the knuckles thereof, the said second means being resiliently mounted on said machine, whereby the parts of said second means contacting the said legs and fins are forced upwardly into positions immediately under the carapace of the crab and inwardly immediately adjacent and above the knuckles of said legs and fins.

3. In a machine for processing a crab having a ventral thoracic groove: means for drawing the abdomen of said crab from the thorax thereof, whereby said groove is exposed; a conveyor system including carriers, each of said carriers having surfaces adapted to contact and hold a crab thereon; and each of the carriers having means thereon for engaging said groove, whereby positional stability of said crab on said carrier is enhanced.

4. The combination set forth in claim 3 and further defined by: said groove engaging means comprising a ridge on the crab contacting surfaces of said carrier and adapted to engage said thoracic groove.

5. In a machine for processing a crab; a conveyor system including carriers, each carrier adapted to carry a crab; and cutting means comprising a plurality of actuated saws positioned proximate to the path of said crab and adapted to effect cuts in the thorax of the crab as the crab passes thereby.

6. The combination set forth in claim 5 and further defined by: the said plurality of saws comprising: a plurality of actuated saws adapted to effect cuts in vertical planes between the thorax and leg knuckles of the crab, and a plurality of actuated saws adapted to effect cuts in planes inclined to the vertical between the extensor and the flexor and fin muscles of the crab.

7. The combination set forth in claim 5 and further defined by: the thorax of the crab on said carrier, while being in operational position with said cutting means, being in such angular relation to the direction of movement of said carrier as to effect cuttings of the thorax in planes at angles to the median vertical plane of said thorax.

8. In a machine for processing a crab: a conveyor system including a series of carriers; a plurality of actuated saws juxtaposed the path of said carriers, said carriers being adapted to rotate about their vertical axes; said system including: means on each of said carriers for holding thereon and releasing the thorax of the crab; means for intermittently rotating the said carrier about its axis; and means for locking said carrier against axial rotation between said intermittent axial rotations; whereby the said held thorax is moved past and engages said saws at different angles of presentation.

9. In a machine for processing a crab: a conveyor system including a series of carriers; a plurality of actuated saws juxtaposed the path of said carriers; said system including: means on each of said carriers for gripping the forward and the rear sides of the thorax of the crab, whereby the thorax is held in position and the lateral sides thereof are free and clear to engage the said saws; and means for removing said thorax from said carrier.

10. The combination set forth in claim 9 and further defined by: the said removing means consisting of an electrical solenoid with plunger juxtaposed the path of said carrier.

11. In a machine for processing a crab: a conveyor system including a series of carriers; a plurality of actuated saws juxtaposed the path of said carriers; said system including: gripping means on each of said carriers for holding thereon and releasing the thorax of the crab; and means for adjusting the positions of said gripping means on said carriers relative to the positions of said saws in accordance with the size of the individual thorax being moved by said carrier.

12. The combination set forth in claim 8 and further defined by: the said holding and releasing means including: an anterior gripper and a posterior gripper, the grippers being mounted at opposite sides of said carrier at a position level with the position of said thorax on said carrier, each gripper being adapted to be moved toward and away from each other and said thorax; and means for moving said grippers toward said thorax for holding said thorax on said carrier and away from said thorax for releasing said thorax from said carrier.

13. The combination set forth in claim 12 and further defined by the said holding and releasing means including: a ridge on the surface of said carrier that contacts said thorax, the said ridge extending longitudinally between said grippers, whereby the said ridge contacts and engages the groove in the ventral surface of the said thorax, thereby providing enhanced lateral stability to said thorax.

14. The combination set forth in claim 12 and further defined by: the said grippers moving means consisting of: a cam surface on the base of said machine; a cam follower extending axially the said carrier and into contact with said cam surface; and gear means between said cam follower and said grippers, whereby the relative movement between said follower and said carrier is translated into relative movement between said grippers.

15. The combination set forth in claim 14 and further defined by: the said follower being of such weight that when said follower is not in contact with said cam the weight of said follower causes said follower to move downwardly until said grippers move into contact with and hold said thorax.

16. The combination set forth in claim 8 and further defined by: the said intermittently rotating means including: a rotatable turret mounted on the base of said machine; means on said turret for supporting and moving said carrier and adapted to permit said carrier rotating about its vertical axis; a collar on said carrier; a plurality of arcuate surfaces on a stationary portion of said machine and concentric with and so positioned relative to the path of said collar as to frictionally engage said collar; whereby the said collar and the said carrier are turned about their axis while the said collar and said surfaces are in frictional and relatively moving contact with each other.

17. The combination set forth in claim 16 and further defined by: the said arcuate surfaces being of predetermined length, corresponding to and proportional to the predetermined angles through which the carrier is to be rotated about its axis while said collar is opposite to and in contact with the respective arcuate surfaces.

18. In a machine for processing a crab: a conveyor system including a series of carriers, each carrier being adapted to carry a crab; a plurality of actuated saws juxtaposed the path of said carriers; a rotatable turret mounted on the base of said machine; means for rotating said turret; means mounted on said turret adapted to support and convey each of said carriers in a generally circular path; and means for varying the radial distance of said carrier from the axis of said turret; whereby the distances of clearance between said carrier and said saws as said carrier passes by said saws may be determined and adjusted.

19. The combination set forth in claim 18 and further defined by: said radial distance varying means including: a spring positioned between each of said supports and said turret, adapted to urge said support radially outwardly; cam surfaces on a stationary part of the machine and generally concentric with said turret; and a cam follower on said support in contact with said cam surfaces and adapted to urge said support radially inwardly against the force of said spring, whereby the path of said support is varied from a circle and the distances of clearance between said carrier and said saws may be determined and adjusted.

20. The combination set forth in claim 18 and further defined by: said radial distance varying means including: a plurality of arcuate cams mounted on the base of said machine and concentric with said turret; the said cams being mounted in pairs; one of said cams of said pairs having the working surface thereof sloping upwardly and inwardly toward the axis of said turret to form generally the surface of a cone; the other of said cams of said pairs having an arcuate portion of the upper portion of the working surface thereof of the same form as the said one of said cams of said pairs and the remaining arcuate portion of the working surface of said other of said cams of said pairs extending generally vertically throughout the lower portion of its height; and a pair of cam followers mounted radially on said carrier and maintained at a height with reference to said cam surfaces in proportion to the size of the individual thorax being conveyed by said carrier; whereby, when a follower of said pair of cam followers contacts said working surfaces of said cams, the said carrier is maintained radially distant from the axis of said turret in inverse proportion to the size of said thorax being conveyed by the said carrier, except when a follower of said pair of cam followers is in contact with said generally vertical portion of said other of said cams of said pairs and whereby the said carrier is in a fixed and predetermined position relative to the axis of the turret and the positions of the saws when an individual thorax of less than a predetermined intermediate size is being conveyed by the said carrier.

21. In a machine for processing a crab: a conveyor system including a series of carriers, each carrier being adapted to carry a crab; a plurality of actuated saws juxtaposed the path of said carriers; a rotatable turret mounted on the base of said machine; means for rotating said turret; means mounted on said turret adapted to support and convey each of said carriers in a generally circular path; and means for varying the radial distance of said carrier from the axis of said turret; said radial distance varying means including: a spring postioned between each of said supports and said turret, adapted to urge said support radially outwardly; cam surfaces on a stationary part of the machine and generally concentric with said turret and a cam follower on said support in contact with said cam surfaces and adapted to urge said support radially inwardly against the force of said spring; a plurality of cams concentric with said turret the surface of which slope generally upwardly and inwardly toward said turret with portions of said surfaces generally vertical; a pair of cam followers mounted radially on said carrier, a follower of said pair of cam followers contacting said sloping surfaces at a height proportional to the size of the individual thorax being conveyed by said carrier and contacting said generally vertical portions and positioning said carrier at a definite and predetermined maximum distance from said turret and at a definite and predetermined minimum distance from said saws.

22. In a machine for procesing a crab: a plurality of conveyor systems, means applied to the crab while being moved by the first of said systems for exposing the median ventral groove of the thorax of the crab; and means on subsequent systems for engaging said groove, whereby lateral stability of said thorax in said systems is enhanced.

23. In a machine for processing a crab having a ventral thoracic groove: means for conveying the crab along a path within said machine; a plate positioned in said path and having an opening over which the crab passes; and vacuum means adapted to be applied to said opening, whereby at least a portion of the abdomen of the crab is drawn away from the thorax thereof and whereby said groove is exposed.

24. In a machine for processing a crab having a ventral thoracic groove; means for conveying the crab along a path within the machine; vacuum means adapted to be applied to an opening along said path over which the abdomen of the crab passes, whereby at least a portion of the abdomen of the crab is drawn away from the thorax thereof, and whereby the said groove is exposed; and separate means for removing said abdomen.

25. In a machine for processing a crab: a conveyor system having carriers adapted for engaging the lateral sides of the crab in underlying relation to the carapace of the crab and adapted for moving the crab longitudinally; means for dividing the carapace of the crab longitudinally; and means for removing the divided carapace, whereby the thoracic cavity of the crab is exposed.

26. In a machine for processing a crab: a conveyor system having carriers adapted for engaging the lateral sides of the crab in underlying relation to the carapace of the crab and adapted for moving the crab longitudinally, during a part of which moving the carapace side of the crab faces downwardly; means for dividing the carapace of the crab longitudinally; means for removing the divided carapace, whereby the thoracic cavity of the crab is exposed; and means for brushing and washing away the internal organs in said cavity, the said brushing and washing away being accomplished while the said cavity faces downwardly, whereby the said internal organs and washing materials fall away from said cavity under the force of gravity.

27. The combination set forth in claim 25 and further defined by said engaging means comprising: a plurality of fingers pivoted on the lateral sides of said carriers and adapted to engage the lateral sides of the crab and extending upward toward the carapace of the crab; and resilient means for urging the said fingers toward and engaging the lateral sides of said crab.

28. The combination set forth in claim 25 and further defined by said carapace removing means comprising: a plurality of rods mounted on the base of said machine and adapted in form and position to engage said carapace, whereby the parts of the divided carapace are forced from the crab by the moving of the crab relative to and in engagement with the said rods.

29. The combination set forth in claim 25 and further defined by the lateral-sides engaging system including: a plurality of anvils having surfaces upon which the crab is carried; an endless belt adapted to move said anvils through an upper run and a lower run; and means on said anvils for gripping the lateral sides of the crab, whereby when the carapace side of the crab faces upwardly on said upper run, the said carapace faces downwardly on the said lower run.

30. In a machine for processing a crab comprising: means for drawing away portions of the abdomen of of the crab from the thorax thereof, whereby the ventral thoracic groove of the crab is exposed; means for engaging said groove whereby the lateral stability of the crab in the machine is enhanced; means for breaking off the claws, the legs and the fins of the crab; means for gripping the lateral sides of the crab; means for removing the carapace of the crab, whereby the thoracic cavity of the crab is exposed; means for removing the internal organs within said cavity while the said cavity faces downwardly; means for gripping the forward and the rear faces of the thorax of the crab, whereby the lateral faces of the thorax are exposed; and means for cutting away portions of said thorax, whereby the meat within said thorax is exposed.

31. The combination set forth in claim 5 and further defined by the said plurality of saws comprising a plurality of actuated saws adapted to effect cuts in planes at angles to the vertical between the thorax and the knuckles of the crab.

32. The combination set forth in claim 5 and further defined by the said plurality of saws comprising: a plurality of actuated saws adapated to effect cuts in planes at an angle to the vertical and in planes parallel to the direction of movement of the crab as it passes said saws.

References Cited in the file of this patent

UNITED STATES PATENTS

| | | |
|---|---|---|
| 2,716,776 | Streich et al. | Sept. 6, 1955 |
| 2,784,447 | Thompson et al. | Mar. 12, 1957 |
| 2,838,786 | Ward | June 17, 1958 |
| 2,903,737 | Ward | Sept. 15, 1959 |
| 2,978,334 | Lapeyre | Apr. 4, 1961 |